United States Patent
Manolakos et al.

(10) Patent No.: US 11,770,790 B2
(45) Date of Patent: Sep. 26, 2023

(54) DYNAMIC CONFIGURATION OF MEASUREMENT GAPS

(71) Applicant: QUALCOMM Incorporated, San Diego, CA (US)

(72) Inventors: Alexandros Manolakos, Escondido, CA (US); Jay Kumar Sundararajan, San Diego, CA (US); Weimin Duan, San Diego, CA (US); Krishna Kiran Mukkavilli, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/404,851

(22) Filed: Aug. 17, 2021

(65) Prior Publication Data
US 2022/0078744 A1    Mar. 10, 2022

Related U.S. Application Data

(60) Provisional application No. 63/076,668, filed on Sep. 10, 2020.

(51) Int. Cl.
*H04W 64/00* (2009.01)
*H04W 24/10* (2009.01)

(52) U.S. Cl.
CPC .......... *H04W 64/00* (2013.01); *H04W 24/10* (2013.01)

(58) Field of Classification Search
None
See application file for complete search history.

(56) References Cited

U.S. PATENT DOCUMENTS

| 2013/0150073 A1* | 6/2013 | Jovicic | G01S 5/021 |
| | | | 455/456.1 |
| 2017/0280280 A1 | 9/2017 | Jain et al. | |
| 2022/0163614 A1* | 5/2022 | Wong | G01S 5/14 |

FOREIGN PATENT DOCUMENTS

WO     2018028941 A1    2/2018

OTHER PUBLICATIONS

Ericsson: "Evaluations of Richer UE Feedback for OTDOA", 3GPP Draft, 3GPP TSG RAN WG1 Meeting #82, R1-154763_OTDOA_Richer_UE_Feedback, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015 Aug. 30, 2015 (Aug. 30, 2015), XP051021037, pp. 1-7, Retrieved from Internet:URL:http://www.3gpp.org/ftp/tsg_ran/WG1_RL1/TSGR1_82/Docs/[retrieved Aug. 30, 2015]Figs 1-5,Sections,1 Intro,2 Richer UE Feedback Evals.

(Continued)

*Primary Examiner* — Suhail Khan
(74) *Attorney, Agent, or Firm* — QUALCOMM Incorporated

(57) ABSTRACT

Disclosed are techniques for wireless communication. In an aspect, a user equipment (UE) may receive, from a network entity, a request to provide an enhanced positioning measurement report comprising a positioning measurement and further comprising a report of components of a channel power delay profile (PDP), a report of a probability distribution of times of arrival (ToA), or both. The UE may determine an enhanced measurement period required by the UE to perform the enhanced positioning measurement, wherein the enhanced measurement period is longer than a standard measurement period required by the UE to perform a non-enhanced positioning measurement. The UE may perform the enhanced positioning measurement using the (Continued)

enhanced measurement period. The UE may provide the enhanced positioning measurement report to the network entity.

30 Claims, 19 Drawing Sheets

(56) References Cited

OTHER PUBLICATIONS

International Search Report and Written Opinion—PCT/US2021/046513—ISA/EPO—dated Dec. 20, 2021.
QC Inc: "On PRS-RSTD Measurements in NR Positioning",3GPP Draft,R4-2003567,3GPP TSG-RAN WG4 Mtg #94-e-Bis,3rd Gen Partnership Project (3GPP), Mobile Comp Cntre,650,Route Des Lucioles,F-06921 Sophia-Antipolis Cedex,FR,vol. RAN WG4,No. Online Mt,Apr. 20, 2020-Apr. 30, 2020,Apr. 10, 2020(Apr. 10, 2020)XP051874998,pp. 1-14, Retrieved Internet:URL:https://ftp.3gpp.org/tsg_ran/WG4_Radio/TSGR4_94_eBis/Docs/R4-2003567.zip R4-2003567—On PRS-RSTD MEAS in NR positioning.docx[retrieved Apr. 10, 2020]para[06.1],Sec,6.1.MEAS Period, 7.Conclusions.

\* cited by examiner

DYNAMIC CONFIGURATION OF MEASUREMENT GAPS

CROSS-REFERENCE TO RELATED APPLICATIONS

The present application for patent claims the benefit of U.S. Provisional Application No. 63/076,668, entitled "DYNAMIC CONFIGURATION OF MEASUREMENT GAPS," filed Sep. 10, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method includes receiving, from a network entity, a request to provide an enhanced positioning measurement report comprising a positioning measurement and further comprising a report of components of a channel power delay profile (PDP), a report of a probability distribution of times of arrival (ToA), or both; determining an enhanced measurement period required by the UE to perform the enhanced positioning measurement, wherein the enhanced measurement period is longer than a standard measurement period required by the UE to perform a non-enhanced positioning measurement; performing the enhanced positioning measurement using the enhanced measurement period; and providing the enhanced positioning measurement report to the network entity.

In an aspect, a method includes sending, to a UE, a request to provide an enhanced positioning measurement report comprising a positioning measurement and further comprising a report of components of a channel PDP, a report of a probability distribution of ToA, or both; determining an enhanced measurement period required by the UE to perform the enhanced positioning measurement, wherein the enhanced measurement period is longer than a standard measurement period required by the UE to perform a non-enhanced positioning measurement; and receiving, from the UE, the enhanced positioning measurement report.

In an aspect, a UE includes a memory; at least one transceiver; and at least one processor communicatively coupled to the memory and the at least one transceiver, the at least one processor configured to: receive, via the at least one transceiver, from a network entity, a request to provide an enhanced positioning measurement report comprising a positioning measurement and further comprising a report of components of a channel PDP, a report of a probability distribution of ToA, or both; determine an enhanced measurement period required by the UE to perform the enhanced positioning measurement, wherein the enhanced measurement period is longer than a standard measurement period required by the UE to perform a non-enhanced positioning measurement; perform the enhanced positioning measurement using the enhanced measurement period; and provide the enhanced positioning measurement report to the network entity.

In an aspect, a network entity includes a memory; at least one transceiver; and at least one processor communicatively coupled to the memory and the at least one transceiver, the at least one processor configured to: send, via the at least one transceiver, to a UE, a request to provide an enhanced positioning measurement report comprising a positioning measurement and further comprising a report of components of a channel PDP, a report of a probability distribution of ToA, or both; determine an enhanced measurement period required by the UE to perform the enhanced positioning measurement, wherein the enhanced measurement period is longer than a standard measurement period required by the UE to perform a non-enhanced positioning measurement; and receive, via the at least one transceiver, from the UE, the enhanced positioning measurement report.

In an aspect, a UE includes means for receiving, from a network entity, a request to provide an enhanced positioning measurement report comprising a positioning measurement and further comprising a report of components of a channel PDP, a report of a probability distribution of ToA, or both; means for determining an enhanced measurement period required by the UE to perform the enhanced positioning measurement, wherein the enhanced measurement period is longer than a standard measurement period required by the UE to perform a non-enhanced positioning measurement; means for performing the enhanced positioning measurement using the enhanced measurement period; and means for providing the enhanced positioning measurement report to the network entity.

In an aspect, a network entity includes means for sending, to a UE, a request to provide an enhanced positioning measurement report comprising a positioning measurement and further comprising a report of components of a channel PDP, a report of a probability distribution of ToA, or both; means for determining an enhanced measurement period required by the UE to perform the enhanced positioning measurement, wherein the enhanced measurement period is longer than a standard measurement period required by the UE to perform a non-enhanced positioning measurement; and means for receiving, from the UE, the enhanced positioning measurement report.

In an aspect, a non-transitory computer-readable medium storing computer-executable instructions that, when executed by a UE, cause the UE to: receive, from a network entity, a request to provide an enhanced positioning measurement report comprising a positioning measurement and further comprising a report of components of a channel PDP, a report of a probability distribution of ToA, or both; determine an enhanced measurement period required by the UE to perform the enhanced positioning measurement, wherein the enhanced measurement period is longer than a standard measurement period required by the UE to perform a non-enhanced positioning measurement; perform the enhanced positioning measurement using the enhanced measurement period; and provide the enhanced positioning measurement report to the network entity.

In an aspect, a non-transitory computer-readable medium storing computer-executable instructions that, when executed by a network entity, cause the network entity to: send, to a UE, a request to provide an enhanced positioning measurement report comprising a positioning measurement and further comprising a report of components of a channel PDP, a report of a probability distribution of ToA, or both; determine an enhanced measurement period required by the UE to perform the enhanced positioning measurement, wherein the enhanced measurement period is longer than a standard measurement period required by the UE to perform a non-enhanced positioning measurement; and receive, from the UE, the enhanced positioning measurement report.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
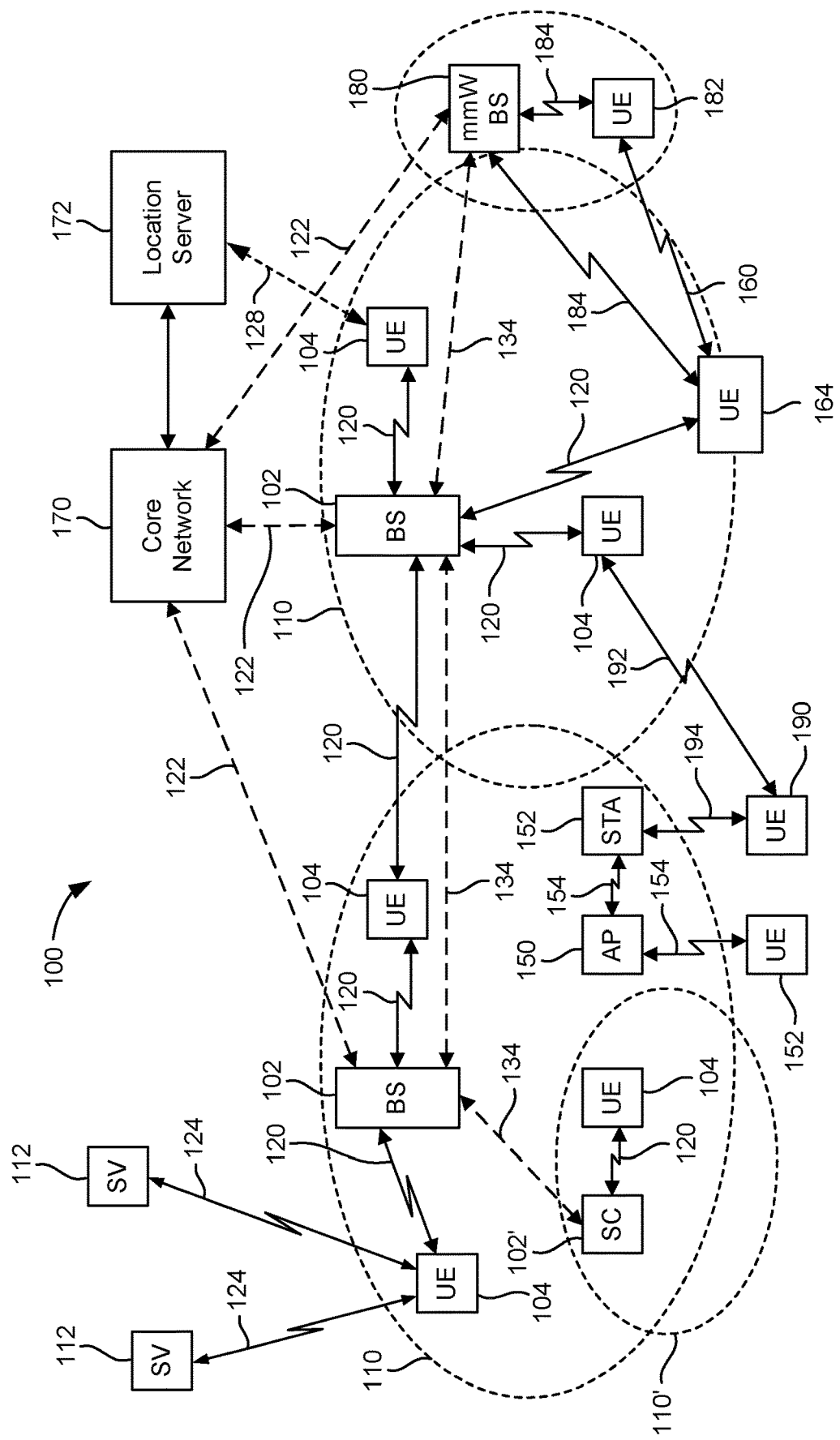
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', WLAN AP 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
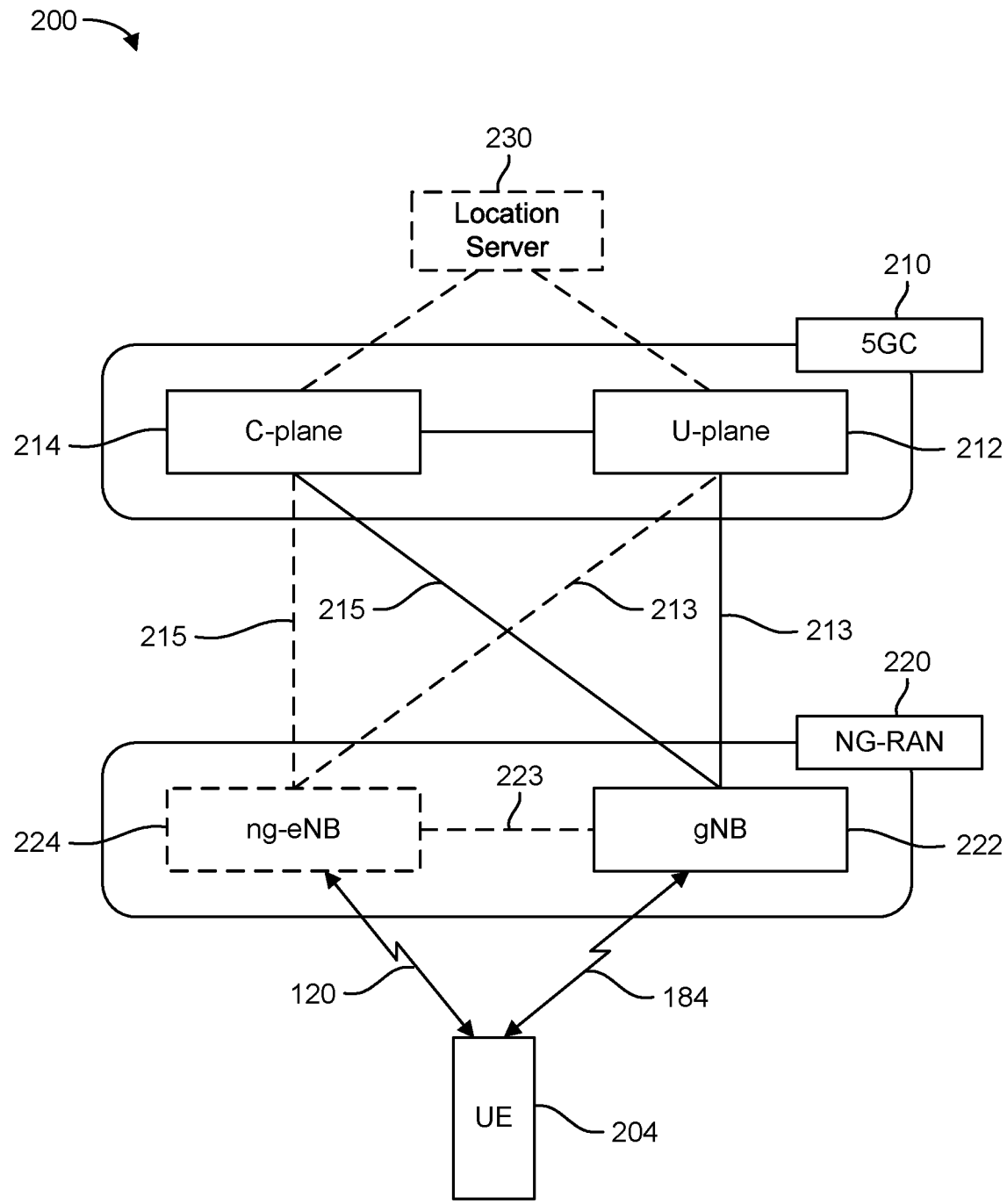
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
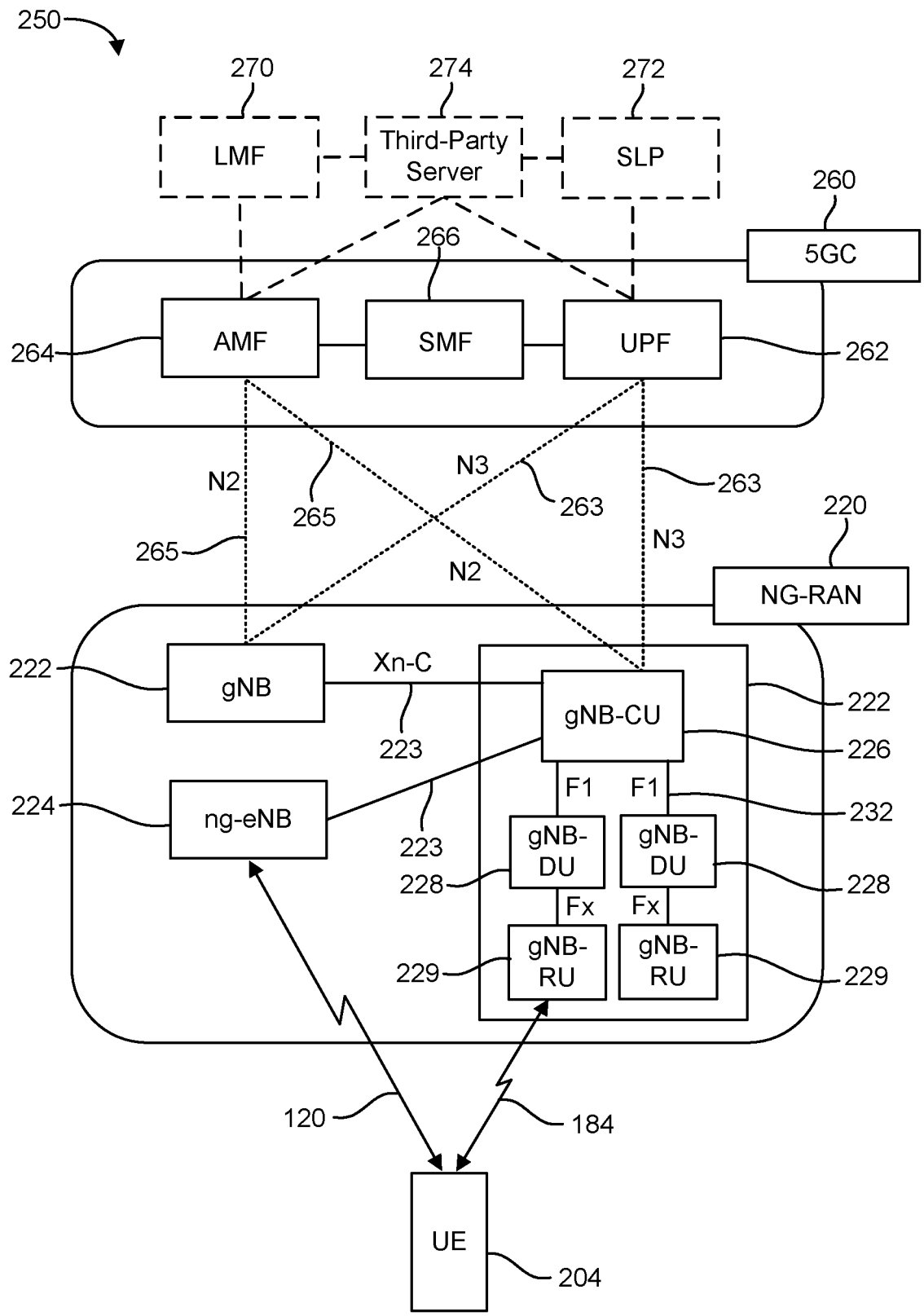

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
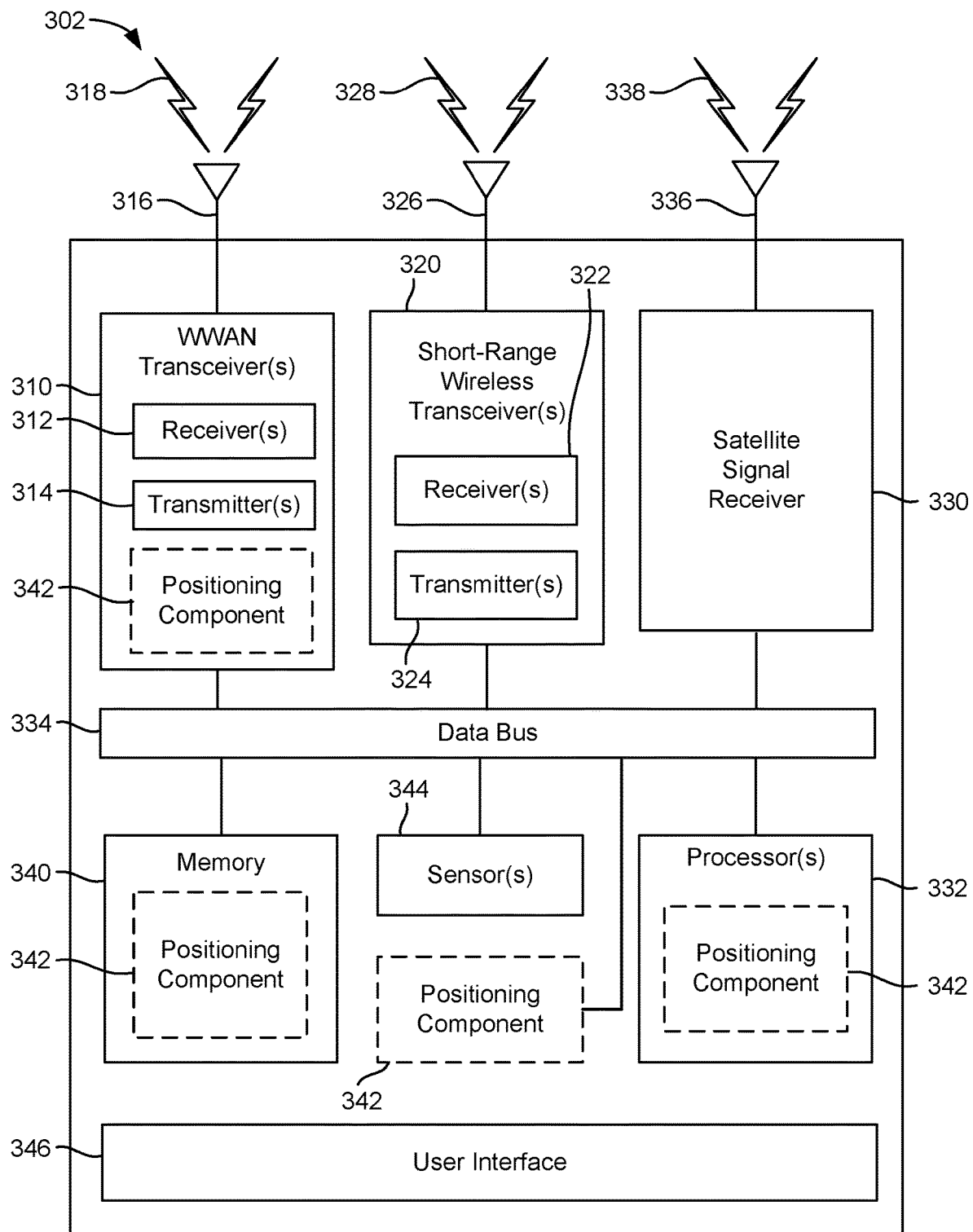
FIGS. 3A, 3B, and 3C are simplified block diagrams of several sample aspects of components that may be employed in a user equipment (UE), a base station, and a network entity, respectively, and configured to support communications as taught herein.
Figure 3B:
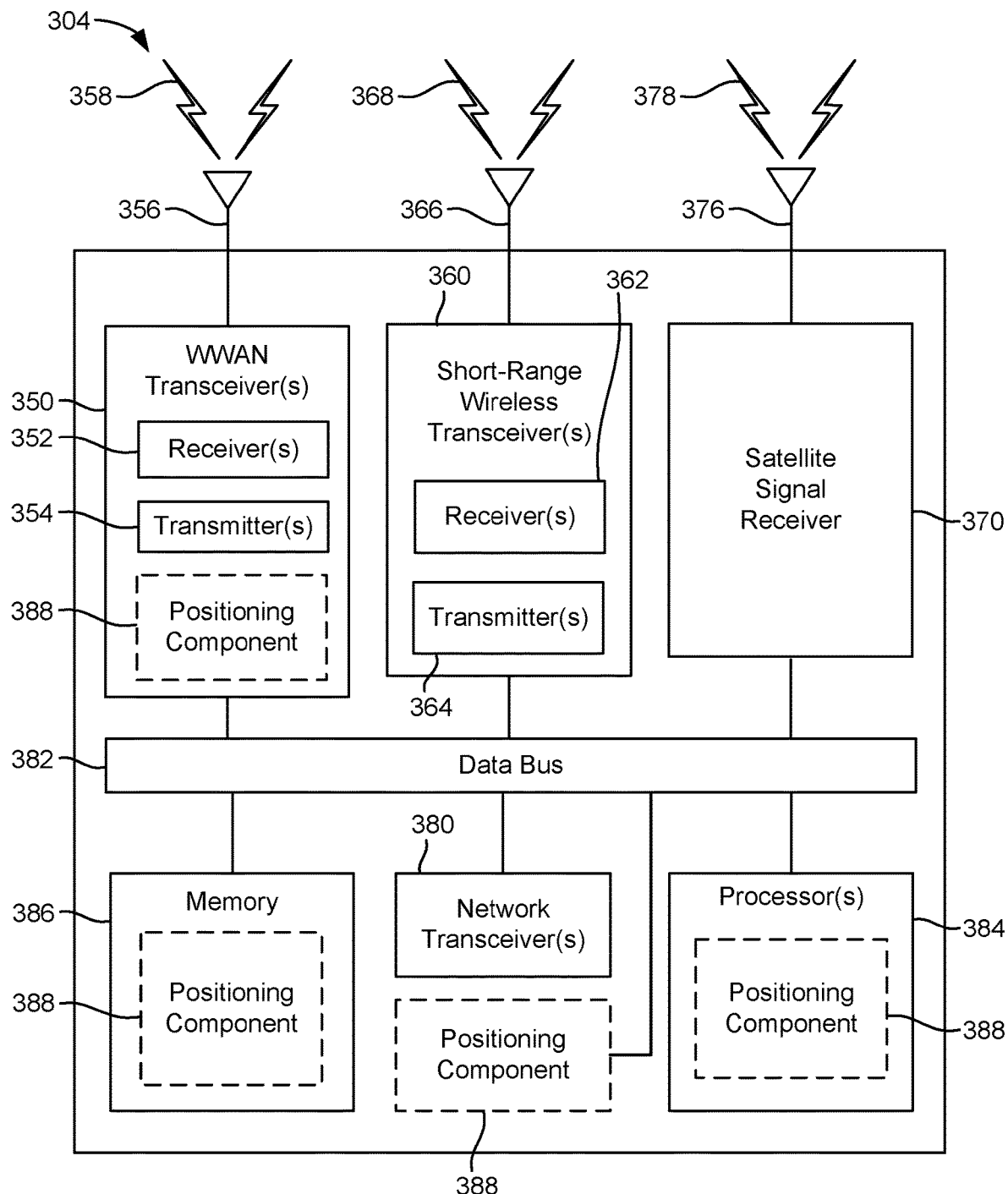
Figure 3C:
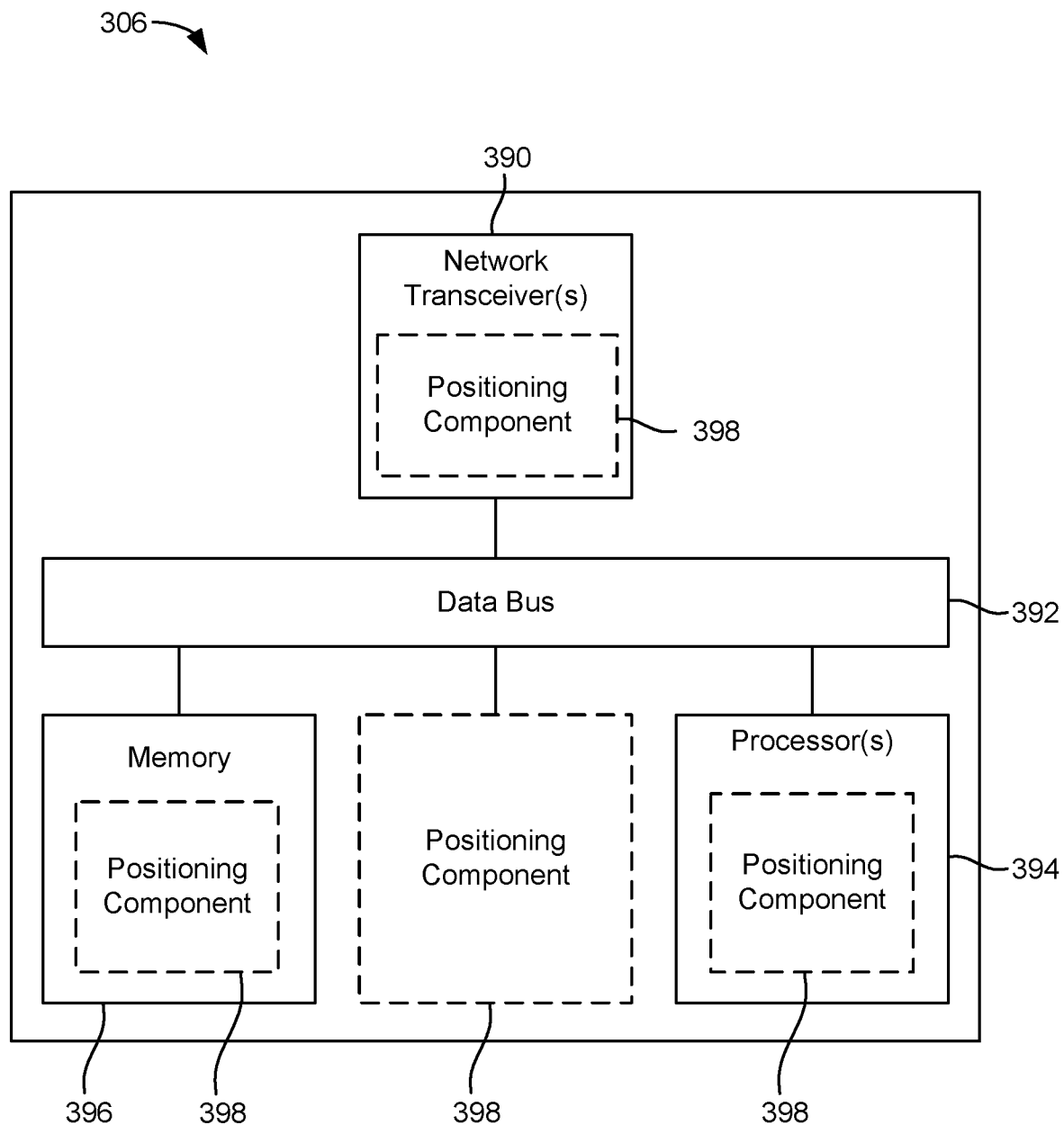

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Various frame structures may be used to support downlink and uplink transmissions between network nodes (e.g., base stations and UEs).

Figure 4A:
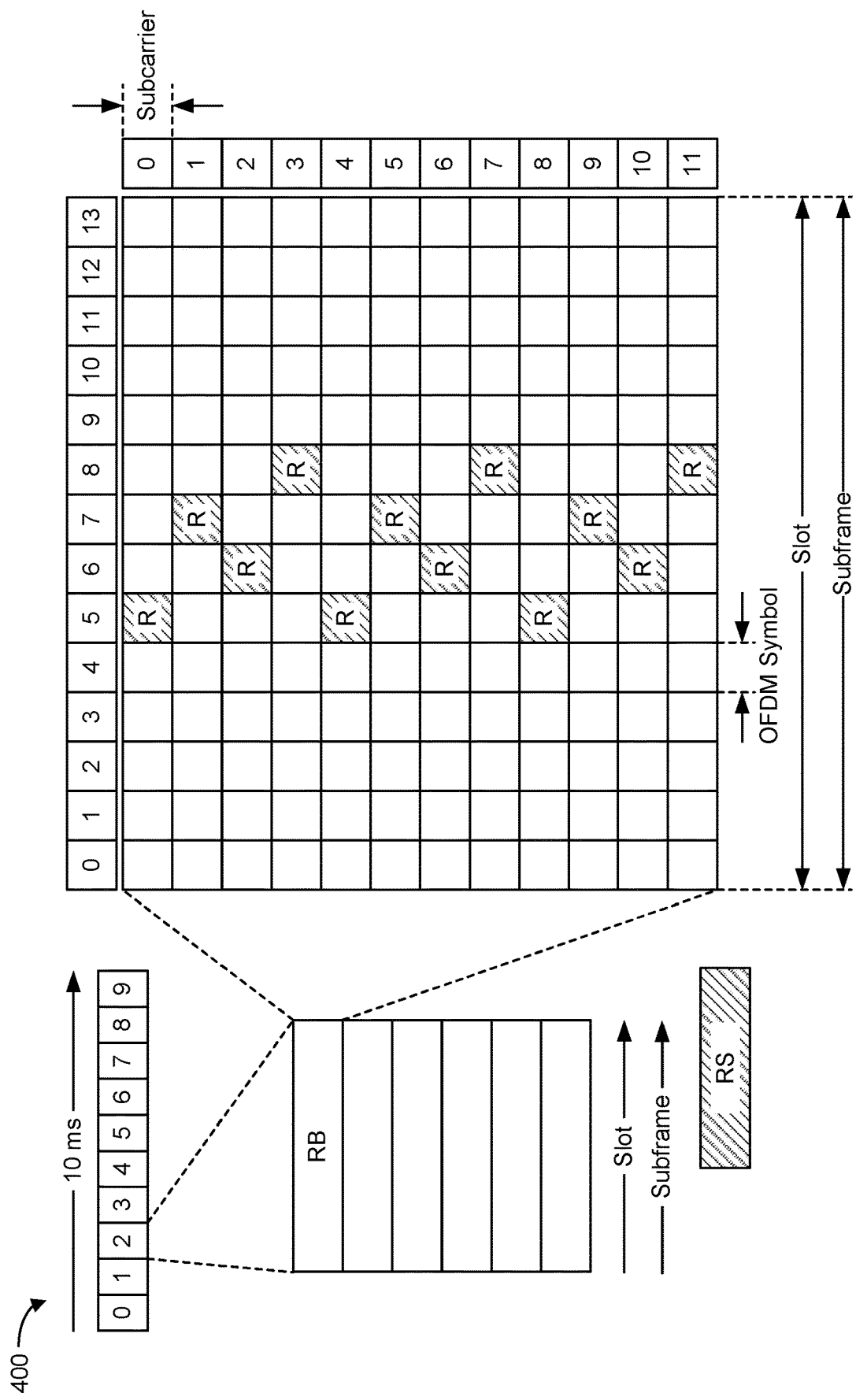
FIG. 4A is a diagram illustrating an example frame structure, according to aspects of the disclosure.

FIG. 4A is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4A, a numerology of 15 kHz is used. Thus, in the time domain, a 10 ms frame is divided into 10 equally sized subframes of 1 ms each, and each subframe includes one time slot. In FIG. 4A, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4A, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4A illustrates example locations of REs carrying a reference signal (labeled "R").

Figure 4B:
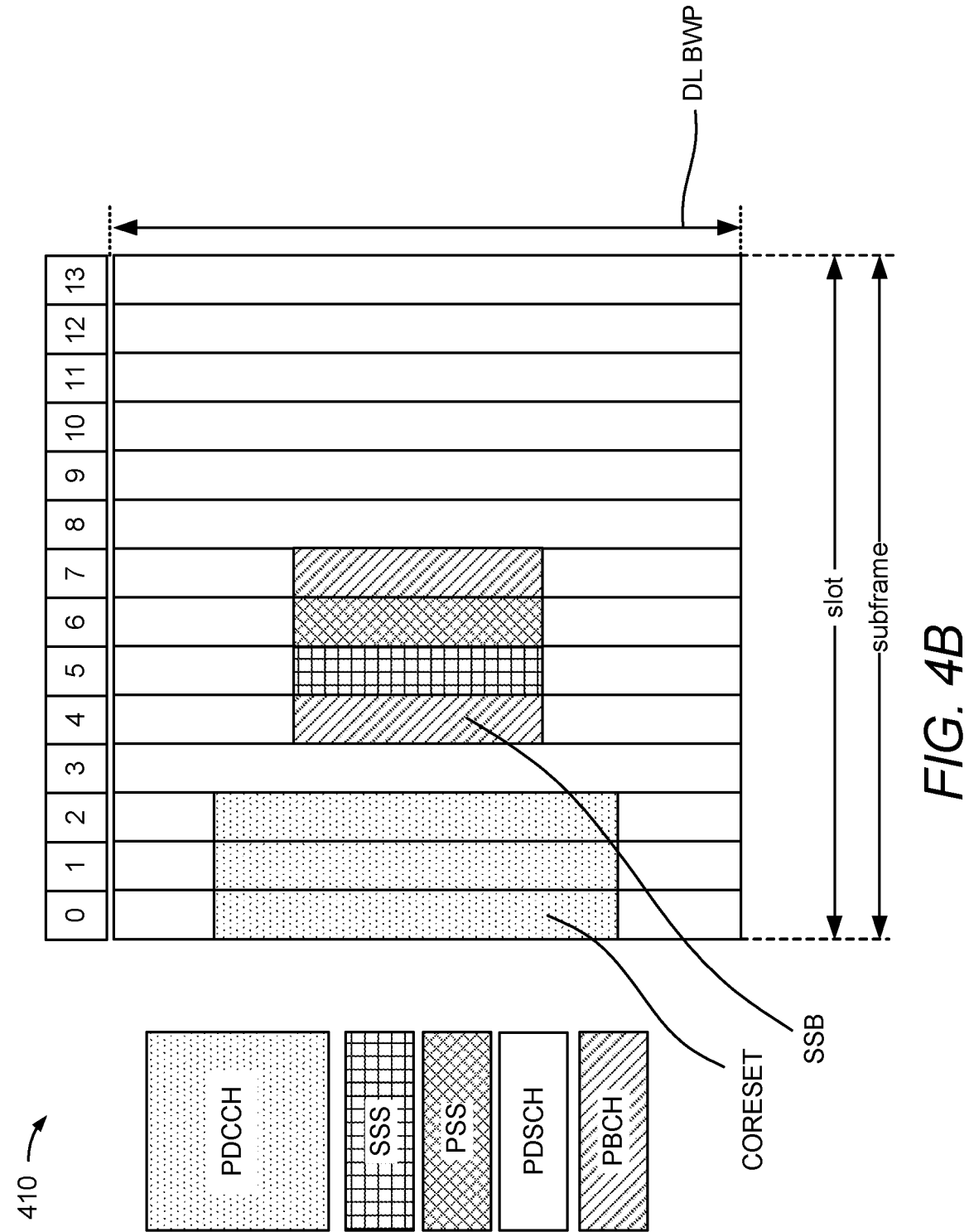
FIG. 4B is a diagram illustrating various downlink channels within an example downlink slot, according to aspects of the disclosure.

FIG. 4B is a diagram 410 illustrating various downlink channels within an example downlink slot. In FIG. 4B, time is represented horizontally (on the X axis) with time increasing from left to right, while frequency is represented vertically (on the Y axis) with frequency increasing (or decreasing) from bottom to top. In the example of FIG. 4B, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

For positioning in cellular systems, a gNB or other base station 102 typically transmits a reference signal and the UE 104 is configured to measure and report certain pre-defined metrics such as reference-signal-received-power (RSRP), time-of-arrival (TOA), round-trip-time (RTT), reference signal time difference (RSTD). In some cases, however, the UE may not be able to obtain an accurate measurement of the metric For example, if the line-of-sight (LOS) channel path is attenuated due to blockage, the UE may derive the TOA based on a non-line-of-sight (NLOS) path leading to an over-estimate. An example of this is shown in FIG. 5.

Figure 5:
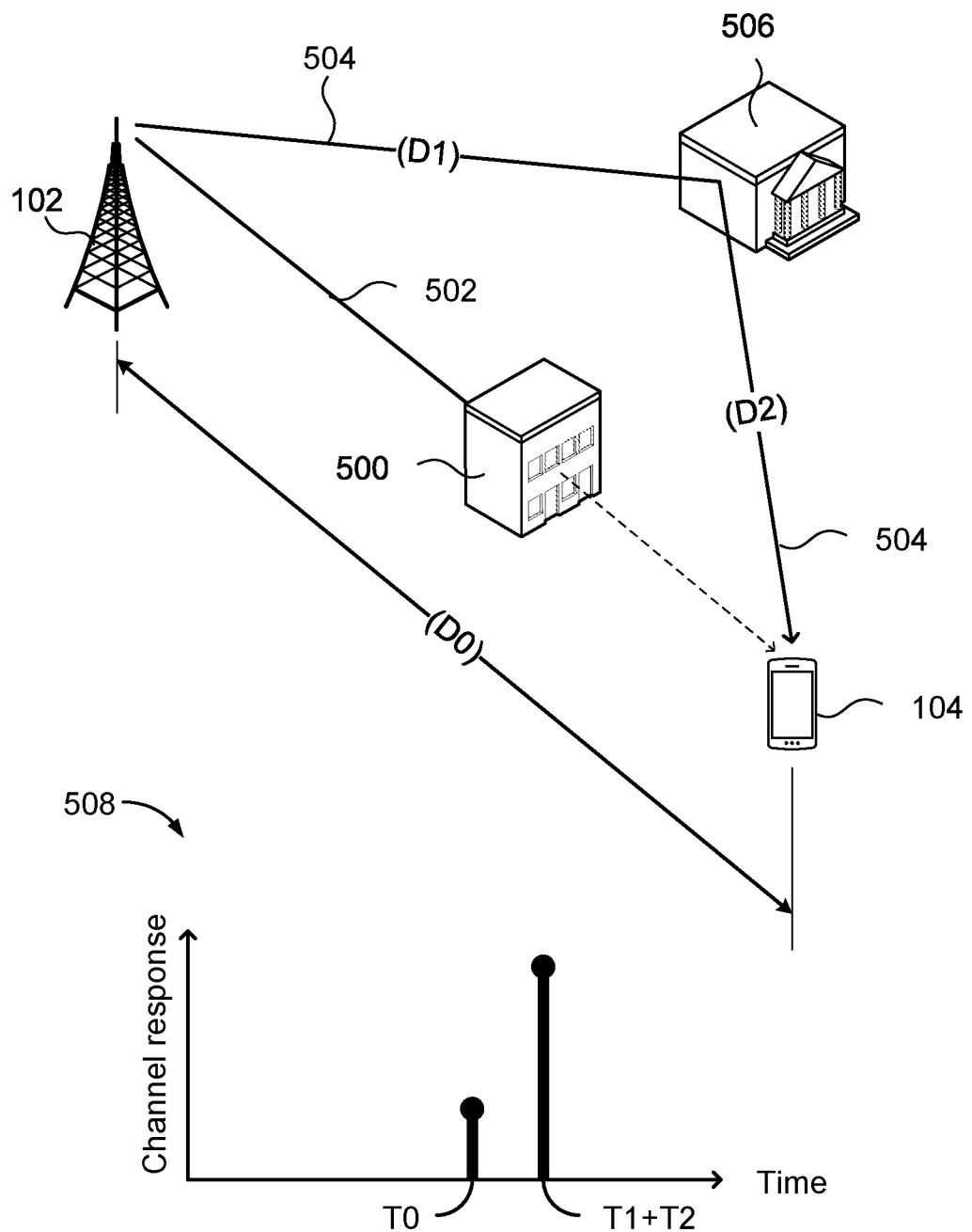
FIG. 5 illustrates a scenario in which a user equipment (UE) only receives non-line-of-sight (NLOS) positioning reference signals (PRSs).

FIG. 5 illustrates a scenario in which a base station 102 is transmitting a reference signal to a UE 104 in an environment where one building or other obstacle 500 prevents the UE 104 from receiving a strong LOS signal 502 or blocks the LOS signal 502 entirely, but the UE receives a NLOS signal 504, e.g., reflected from another building or obstacle 506. FIG. 5 also includes a graph 508 of the channel response detected by UE 104 over time. In FIG. 5, the distance from the base station 102 to the UE 104 is labeled D0, and the time of arrival of the LOS signal 502 is labeled T0. The distance traveled by the NLOS signal 504 is D1+D2, and the time of arrival of the NLOS signal 504 is labeled T1+T2. FIG. 5 also shows a graph 510 of channel response over time. This graph 510 shows that the UE 104 receives a weak channel response at time T0 from the blocked or partially blocked LOS signal 502, and a strong channel response at time T1+T2 from the NLOS signal 504. If the UE 104 reports T1+T2 as the TOA of the received reference signal, the base station 102 will overestimate the distance to the UE 104.

Figure 6:
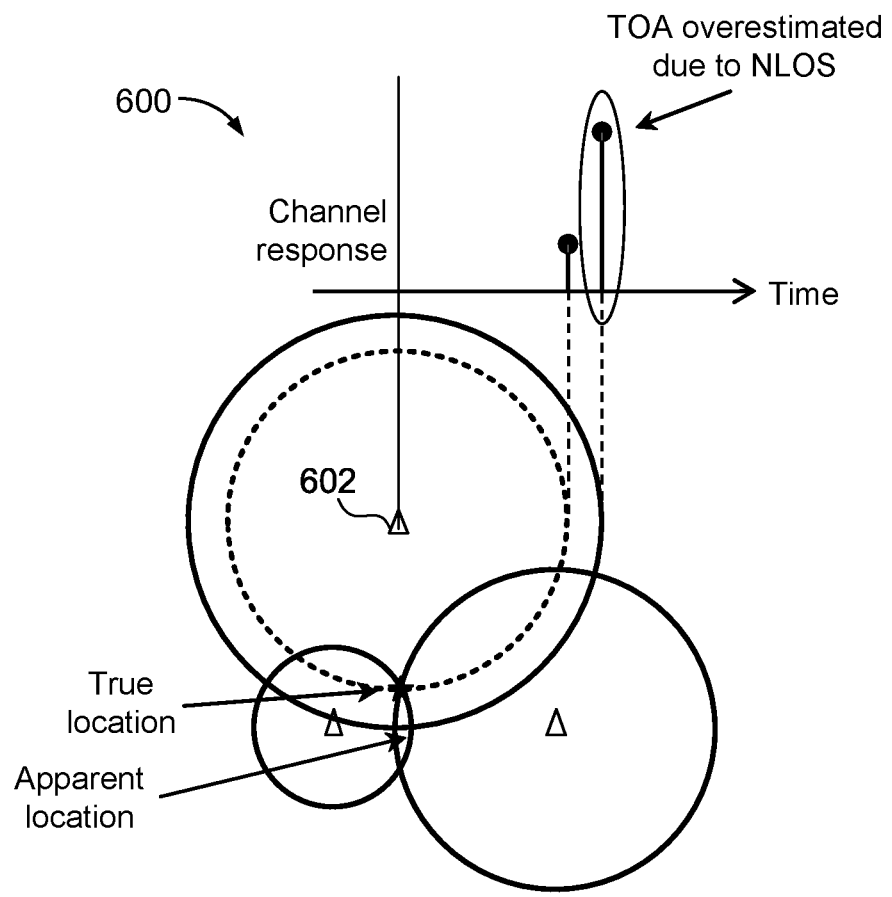
FIG. 6 illustrates an example of a triangulation error caused by NLOS PRSs.

FIG. 6 illustrates an example of a triangulation error caused by the scenario described in FIG. 5. FIG. 6 shows a graph 600 of the channel response of the signal from transmitter 602 as reported by a UE, showing that the TOA is overestimated due to reception of NLOS signals with a stronger channel response than the LOS signal. Because the TOA is overestimated, the triangulation of multiple TOA values reported by the UE, including the overestimated TOA due to NLOS, results in an apparent location that is different from the true location of the UE. Thus, even using additional TOAs from other transmitters may not correct the inaccuracy caused by one overestimated TOA.

To address this problem, additional information may be used to make more accurate determination of TOA. For example, the UE may have additional information regarding the accuracy of its measurement. In some aspects, the UE may use the estimated channel response to derive a probability distribution of the measured quantity. For example, the UE may use the estimated channel response to estimate the timing of the first-arriving channel path, i.e., the time-of-arrival (TOA). In this case, the UE may also be able to derive other estimates of the TOA along with a probability value indicating a confidence on that estimate.

Figure 7:
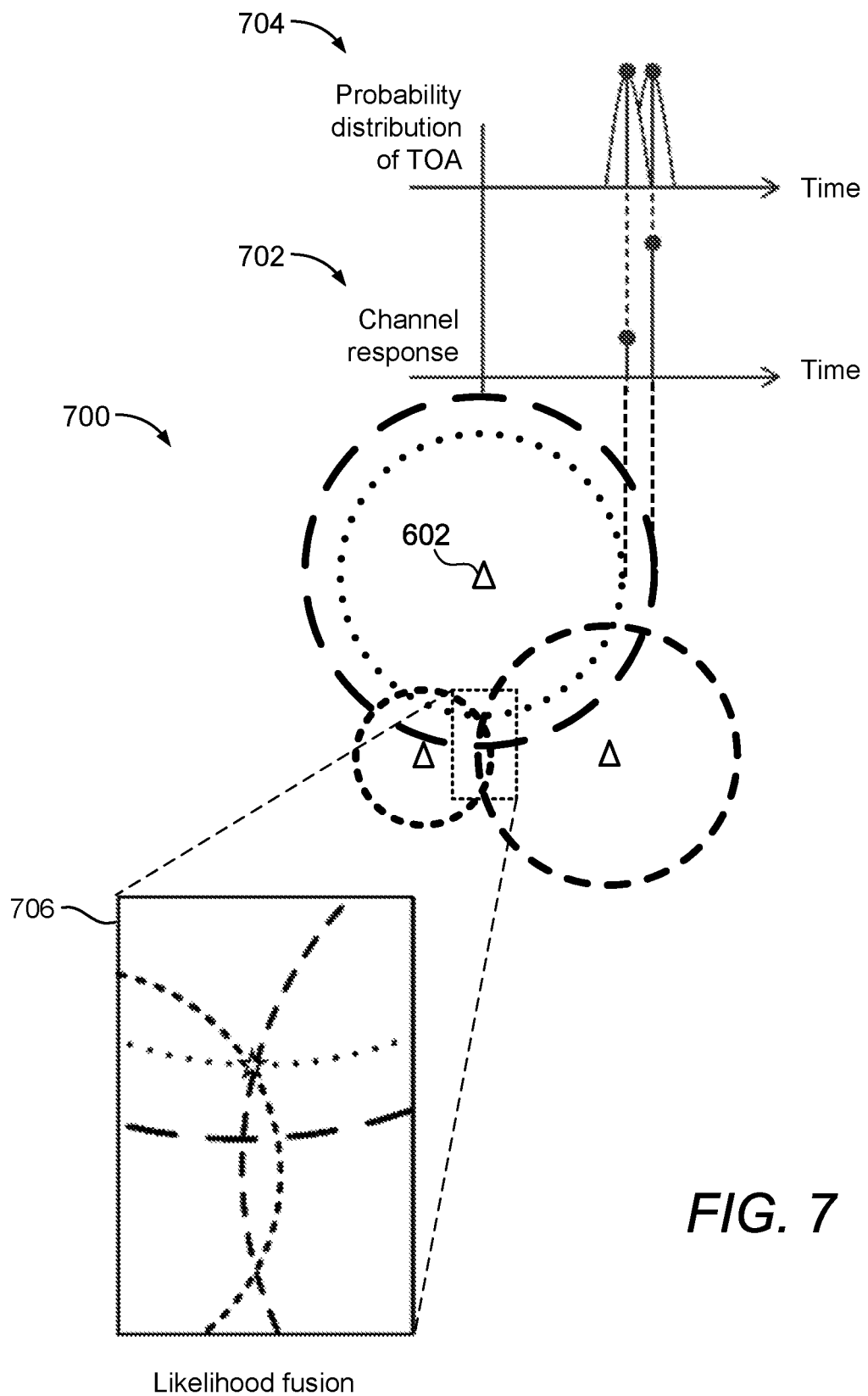
FIG. 7 illustrates method in which both a channel response and a probability of distribution is used to produce a more accurate estimate of the location of a UE according to some aspects.

FIG. 7 illustrates a scenario 700 in which both a channel response 702 and a probability of distribution of TOA 704 is used to produce a more accurate estimate of the location of a UE according to some aspects. In FIG. 7, each of the earlier-arriving and the later-arriving signals are assigned a probability, and these probabilities are considered when calculating a likelihood that the UE will be in a particular location. The combination or "fusion" of all likelihoods results in estimating an accurate location of the UE, as shown in closeup 706. In some aspects, for example, for each point on an X-Y coordinate, each probability distribution assigns a numerical value indicating the probability that a UE is located at that X-Y coordinate, and the numerical values so produced by each probability distribution may be added, multiplied, or otherwise mathematically combined to produce a combined probability for each point in the X-Y coordinate system.

Figure 8:
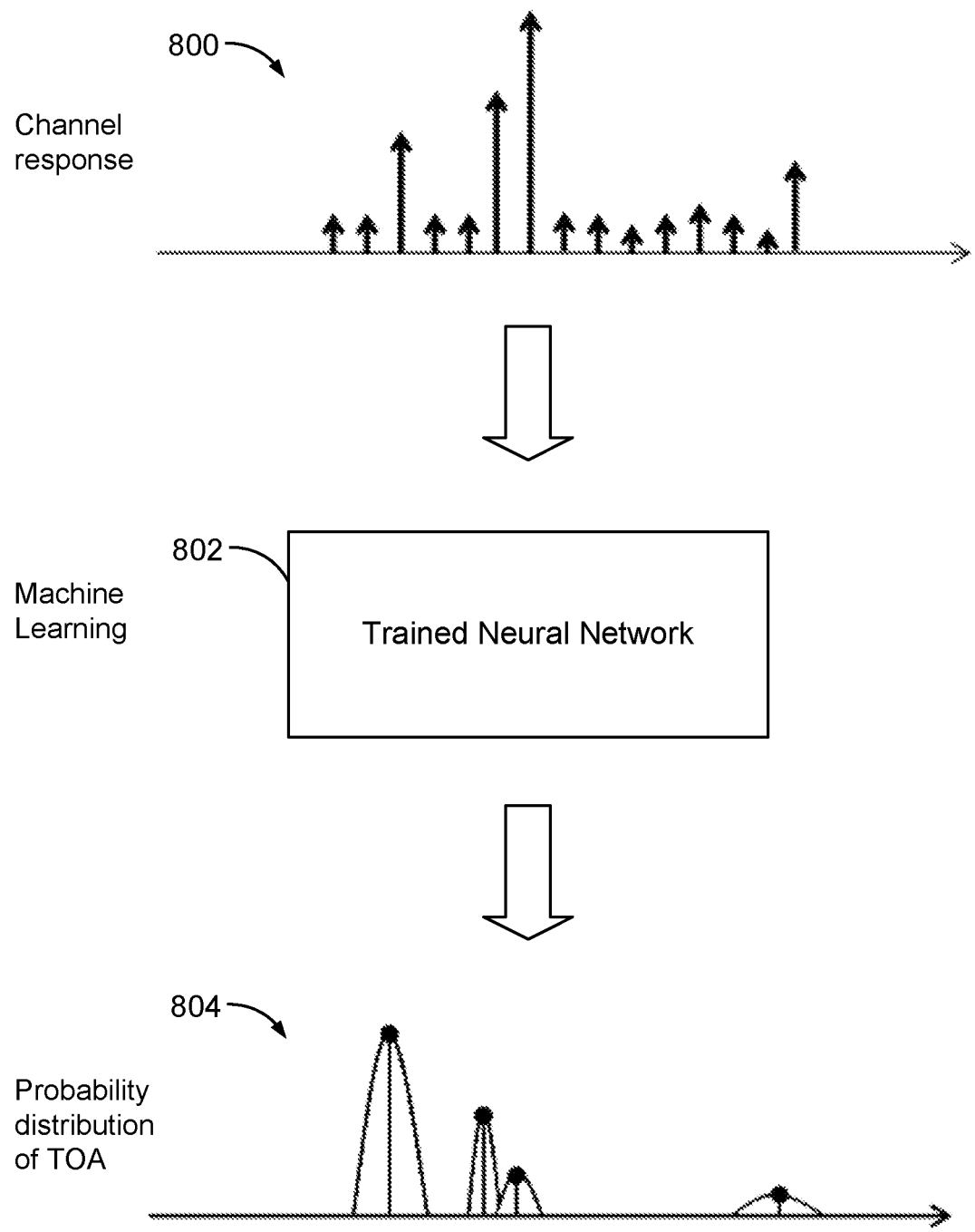
FIGS. 8 and 9 illustrate methods to derive a probability distribution according to some aspects.

FIG. 8 illustrates one method to derive a probability distribution according to some aspects. In FIG. 8, a channel response 800 (e.g., a channel power delay profile (PDP), which is a collection of multipath delays, each having an associated power, which together comprise a PDP) is input into neural network 802 that has been trained to process channel PDPs and output the probability distribution of TOA 804. In some aspects, other information, such as SNR, angle, etc., could also be used as inputs into the neural network 802. Other machine learning techniques may be employed in addition to or instead of the neural network 802.

Figure 9:
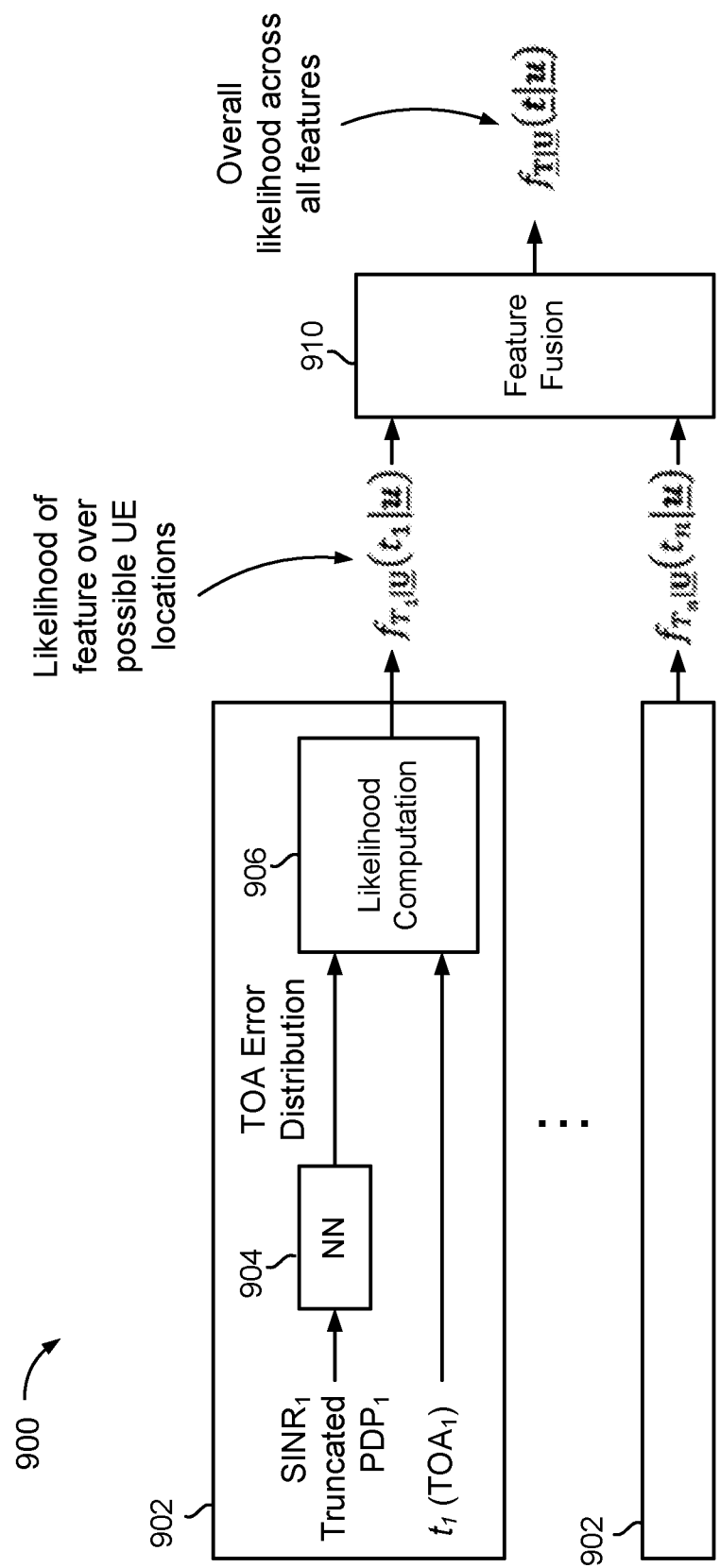

FIG. 9 illustrates a method 900 to derive a probability distribution according to some aspects. In FIG. 9, one or more likelihood estimations 902 are performed, each likelihood estimation 902 taking as input information about a PRS source, such the measured SINR and a truncated PDP, as well as a measured TOA.

In FIG. 9, the SINR and truncated PDP are inputs into a neural network 904, which produces a TOA error distribution. This may be referred to as an inference process. In some aspects, this process includes defining a grid of possible UE locations, and using the neural network 904 to identify the TOA error distribution corresponding to the observed PRS SINR and PDP.

In some aspects, a UE reports a PDP to a network entity, and the network entity derives the TOA error distribution. In some aspects, additional path reports are enhanced to include information such as magnitude of paths.

In some aspects, a UE reports mean RSTD, standard deviation, and probability associated with each path, e.g., in an additional path report. For example, the additional path report includes a "Timing Quality" field; in some aspects, this field is remapped or reused to hold a standard deviation or confidence level information. In some aspects, the additional path report includes a new field corresponding to the probability.

In some aspects, a new report is added that allows the UE to report the probability distribution of the metric (e.g., RSTD). This metric could, for example, be in the form of a probability mass function over pre-defined ranges, could contain the parameters of a Gaussian mixture distribution, or other form. In some aspects, a list of predefined RSTD percentile values (e.g., 5%, 10%, 15%, . . . , 95%) could be used.

In FIG. 9, the TOA error distribution and the measured TOA are inputs into a likelihood computation 906, which calculates a likelihood of the presence of the UE at each of a number of possible locations. In some aspects, the likelihood computation 906 may include, for each sample, applying the calculated TOA error distribution to convert the observed TOA to a likelihood over the grid (e.g., calculating a likelihood for each position on the grid.

In FIG. 9, the likelihoods calculated by each of the likelihood estimations 902 are inputs into a feature fusion 910, which calculates an overall likelihood of the presence of the UE at each of the possible locations. In some aspects, the overall likelihood is calculated as a mathematical function that calculates a likelihood for a particular point on the grid as a function of all of the different likelihood estimations 902 for that particular point on the grid.

Figure 10:
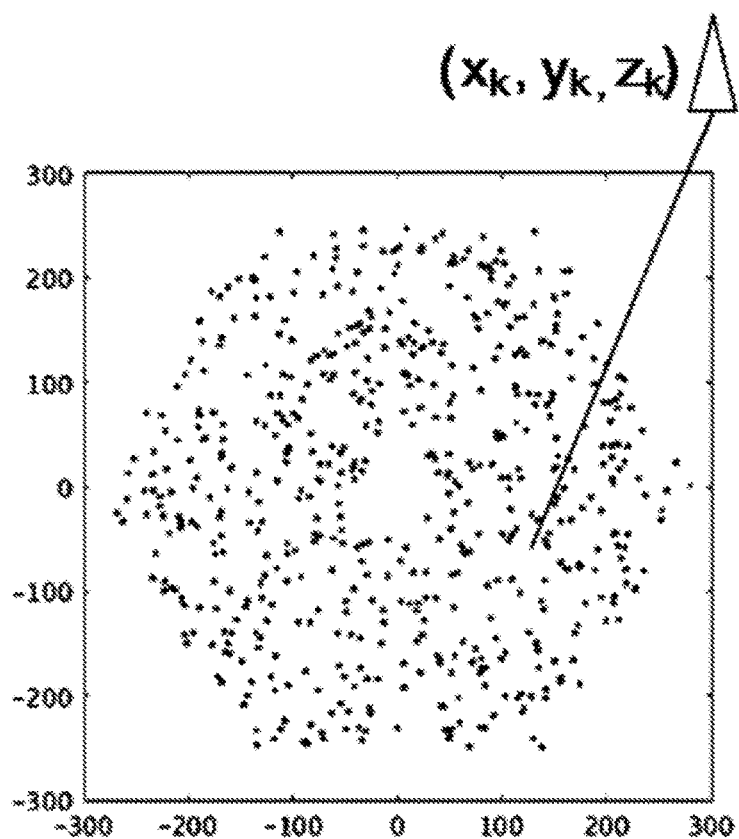
FIG. 10 is a plot showing an example likelihood estimation according to some aspects.
Figure 11:
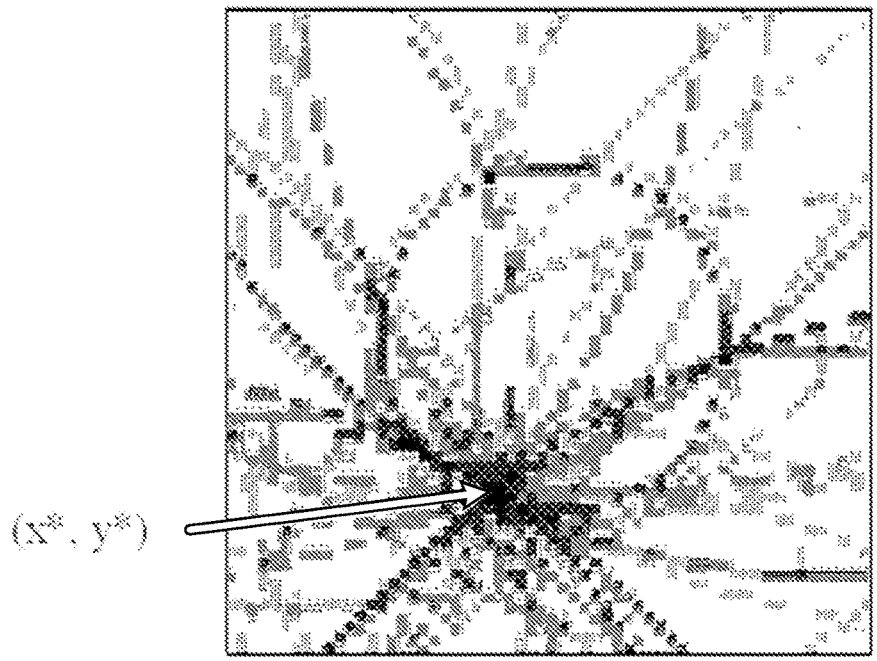
FIG. 11 is a plot showing the result of an example feature fusion according to some aspects.

FIG. 10 is a plot showing an example likelihood estimation 902 according to some aspects. In some aspects, this may include the following algorithm, where $X_k$, $Y_k$, and $Z_k$ are the coordinates of the signal source For each (x,y) point on a 2D grid:

$L_k(x,y) = P(k^{th}$ TOA measurement$=t_k$|UE is at $(x,y,z_{nom})) = P(TOA$ error$=t-d((x_k,y_k,z_k),(x,y,z_{nom}))/c$|UE is at $(x,y,z_{nom})) = P(TOA$ error$=t-d((x_k,y_k,z_k),(x,y,z_{nom})))$ FIG. 11 is a plot showing the result of an example feature fusion 910 according to some aspects. In FIG. 11, the fusion operation includes summation of log-likelihood, which produces the heat map shown in FIG. 11, where brighter pixels indicate higher likelihood and darker pixels indicate lower likelihood. Thus, the brightest portion of FIG. 11 indicates where the UE is most likely to be located. In the example shown in FIG. 11, this coordinate is labeled as (X*, Y*). In some aspects, this determination of maximum likelihood may be iterative, as shown in FIG. 12.

Figure 12:
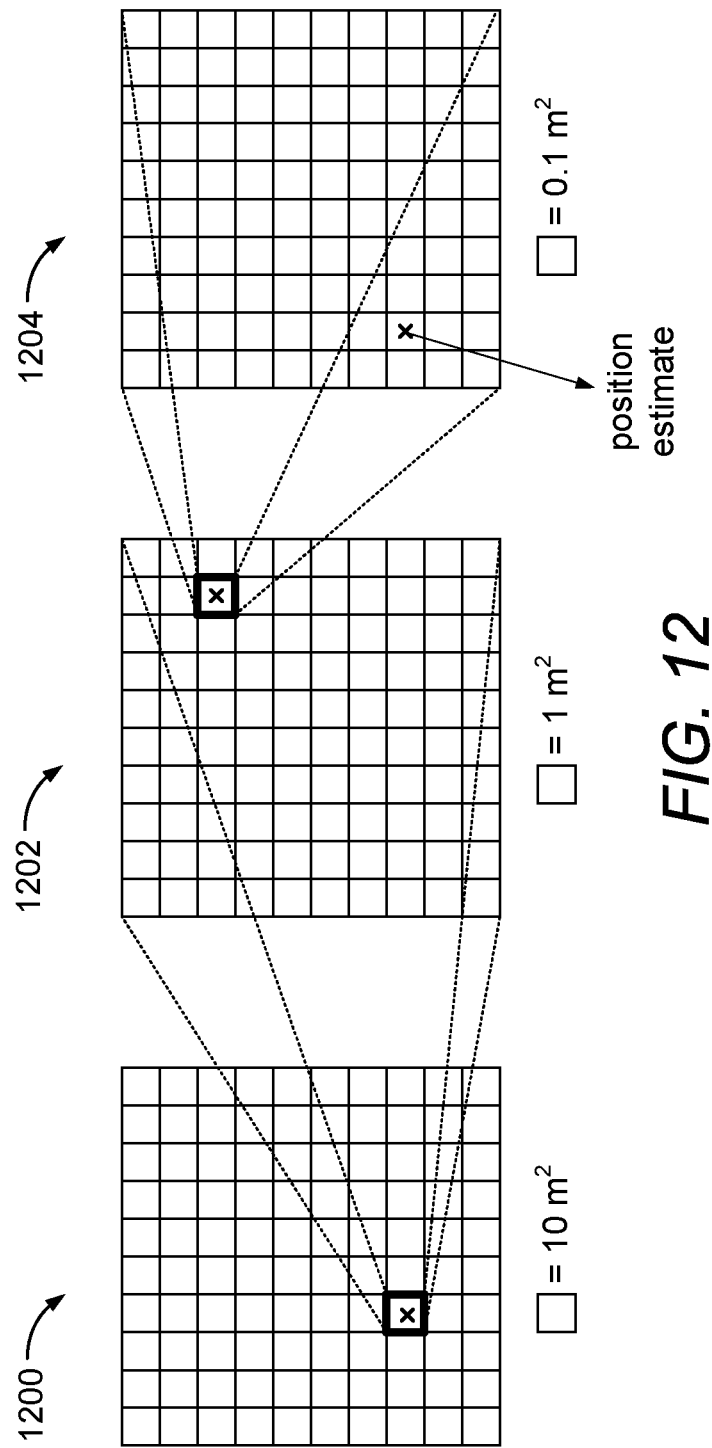
FIG. 12 illustrates a process for determination of maximum likelihood according to some aspects.

FIG. 12 illustrates a process for determination of maximum likelihood according to some aspects, showing a hierarchical grid approach which starts with a coarse grid 1200, then repeats the process with a finer grid 1202, and again with an even finer grid 1204, until a coordinate with a maximum likelihood is found.

The improved methods of determining the position of a UE described above need more samples than conventional methods need, e.g., to have enough data to generate a probability. In order to collect more samples, the improved methods need additional time compared to conventional methods. Specifically, a longer measurement period is needed.

A measurement period is the amount of time the UE needs to derive measurements that meet some predefined accuracy requirements. The measurement period required by a UE can depend on a number of factors, including capability of the UE, which may be expressed as a combination of (N,T) values per frequency band, where N is a duration of DL PRS symbols in milliseconds (ms) processed every T ms for a given maximum bandwidth (BW) in MHz supported by the UE. Example values for N={0.125, 0.25, 0.5, 1, 2, 4, 8, 12, 16, 20, 25, 30, 35, 40, 45, 50} ms. Example values for T={8, 16, 20, 30, 40, 80, 160, 320, 640, 1280} ms. Example values for maximum BW reported by UE={5, 10, 20, 40, 50, 80, 100, 200, 400} MHz. UE capability can include the number of DL PRS resources that UE can process in a slot, which is reported per SCS per band (N'), with example values={1, 2, 4, 8, 12, 16, 32, 64}.

Figure 13:
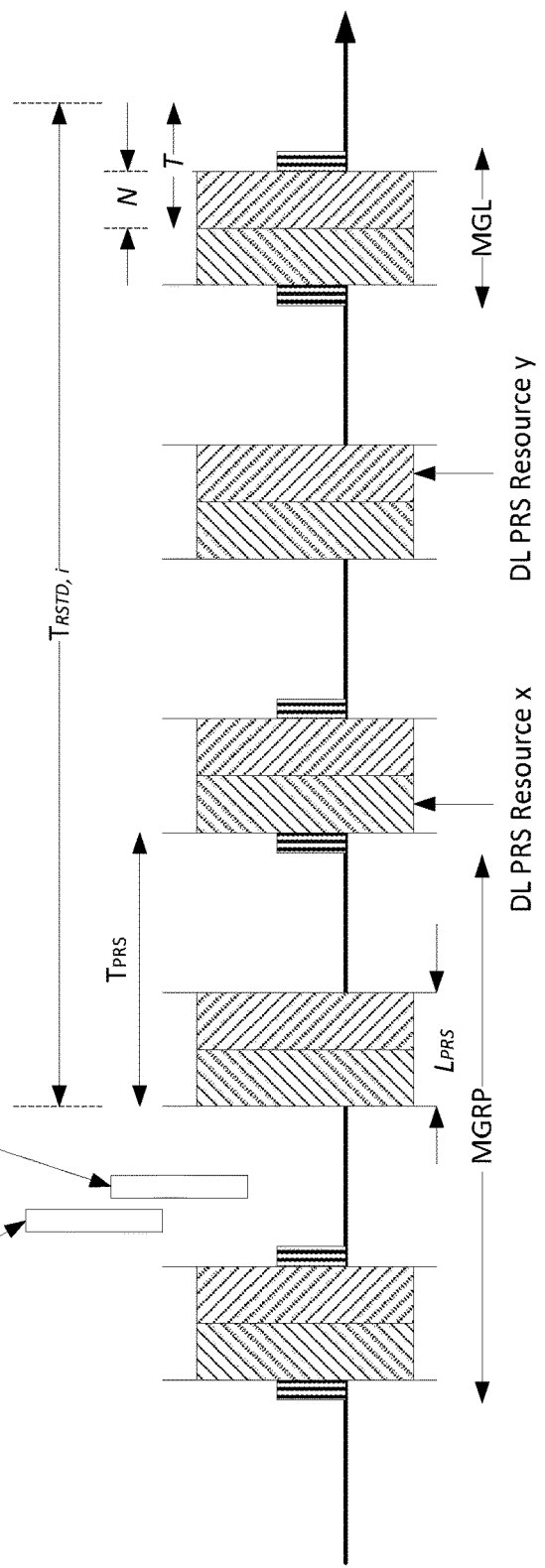
FIG. 13 shows a conventional calculation of a measurement period.

FIG. 13 shows a conventional calculation of a RSTD measurement period for the $i^{th}$ positioning frequency layer, which can be expressed according to the following equation:

$$T_{UERxTx,i} = N_{RxBeam} \cdot CSSF \cdot \left\{ N_{sample} \cdot \max\left(\left\lceil \frac{L_{PRS,i}}{N} \right\rceil, \left\lceil \frac{N_{PRS,i}^{slot}}{N'} \right\rceil\right) \cdot \left\lceil \frac{T}{MGRP_e} \right\rceil \cdot MGRP_e + T \right\}$$

where:
$L_{PRS}$ represents the span of a PRS occasion comprised of all PRS resources in the assistance data defined as the time from the first slot of the earliest PRS resource to the last slot of latest PRS resource in one $T_{PRS}$ window. Depending on UE capability for Type I or Type II duration calculation, $L_{PRS}$ may account for only PRS symbols of slots (Type I) or the entire slot if any of its symbols are PRS (Type II).
$N_{PRS}^{slot}$ is the number of PRS resources in a slot as configured by the assistance data.
$T_{PRS}$ represents the PRS periodicity among all DL PRS resources of a resource set and $T_{PRS,max}$ represents the maximum PRS periodicity among all DL PRS resources of a positioning frequency layer.
MGRP is the measurement gap period as configured by RRC.
CSSF is the carrier-specific scaling factor for measurement with gap sharing with other RRM measurements.
$N_{Rx,beam}$ is the UE Rx beam sweeping factor for FR.
$N_{sample}$ is the basic number of PRS occasions needed to meet the accuracy requirements.

Another conventional calculation of a measurement period is as follows. When the physical layer receives the last NR-TDOA-ProvideAssistanceData message and NR-TDOA-RequestLocationInformation message from LMF via LPP, the UE shall be able to measure multiple (up to the UE capability) DL RSTD measurements, defined in 3GPP TS 38.215, during $T_{RSTD,Total}$ defined further in this section. When measurement gaps and processing time T have overlap between different positioning frequency layers, $T_{RSTD,Total}$ is defined as:

$$T_{RSTD,Total} = \sum_{i=1}^{L} T_{RSTD,i} + (L-1) * \max(T_{effect,i})$$

where:
i is the index of positioning frequency layer.
L is total number of positioning frequency layers.
$T_{effect,i}$ is the periodicity of PRS-RSTD measurement in positioning frequency layer i as defined further in this section.

What the RSTD measurement period should be when measurement gaps and processing time T do not have overlap between different positioning frequency layers has not yet been defined. $T_{PRS-RSTD,i}$ is the measurement period for PRS RSTD measurement in i positioning frequency layer, as specified below:

$T_{PRS-RSTD,i} =$ $\left( CSSF_{PRS,i} * N_{RxBeam,i} * \left\lceil \frac{N_{PRS,i}^{slot}}{N'} \right\rceil \left\lceil \frac{L_{PRS,i}}{N} \right\rceil * N_{sample} - 1 \right) * T_{effect,i} + T_{last}$, where:
$N_{RxBeam,i}$ is the UE Rx beam sweeping factor. In FR1, $N_{RxBeam,i}=1$; and in FR2 $N_{RxBeam,i}=8$.

$CSSF_{PRS,i}$ is the carrier-specific scaling factor for the positioning frequency layer i as defined in clause 9.1.5.2 as $CSSF_{within\_gap,i}$.

$N_{sample}$ is the number of PRS RSTD samples and $N_{sample}=4$.

$T_{last}$ is the measurement duration for the last PRS RSTD sample, including the sampling time and processing time, $T_{last}=T_i+L_{PRS,i}$.

$$T_{effect,i} = \left\lceil \frac{T_i}{T_{available\_PRS,i}} \right\rceil * T_{available\_PRS,i}.$$

$T_{available\_PRS,i}=LCM(T_{PRS,i},MGRP_i)$, the least common multiple between $T_{PRS,i}$ and $MGRP_i$.

$L_{PRS,i}$ is the time duration as defined in clause 5.1.6.5 of 3GPP TS 38.214.

$N_{PRS,i}^{slot}$ is the maximum number of DL PRS resources in positioning frequency layer i configured in a slot.

{N, T} is UE capability combination per band where N is a duration of DL PRS symbols in ms processed every T ms for a given maximum bandwidth supported by UE as specified in clause 4.2.7.2 of 3GPP TS 38.306.

N' is UE capability for number of DL PRS resources that it can process in a slot as specified in clause 4.2.7.2 of 3GPP TS 38.306.

If positioning frequency layer i has more than one DL PRS resource set with different PRS periodicities, the maximum PRS periodicity among DL PRS resource sets is used to derive the measurement period of that positioning frequency layer.

To overcome the technical problem that the conventional calculation of a measurement period may not provide sufficient time for the UE to perform the improved methods for determining a position of a UE described above, a number of approaches are herein presented. In one aspect, a UE derives an enhanced report that may contain mean RSTD, standard deviation and probability associated with each path in an additional path report, a probability distribution of the metric (e.g., TOA, RSTD, Rx-Tx, etc.), or some combination of the above.

To calculate these types of data, an increased measurement period is needed compared to legacy reports, which contain only a single instance of the metric. The measurement period may depend on the confidence needed to be achieved. The increased measurement period may be specified in a number of ways.

Figure 14:
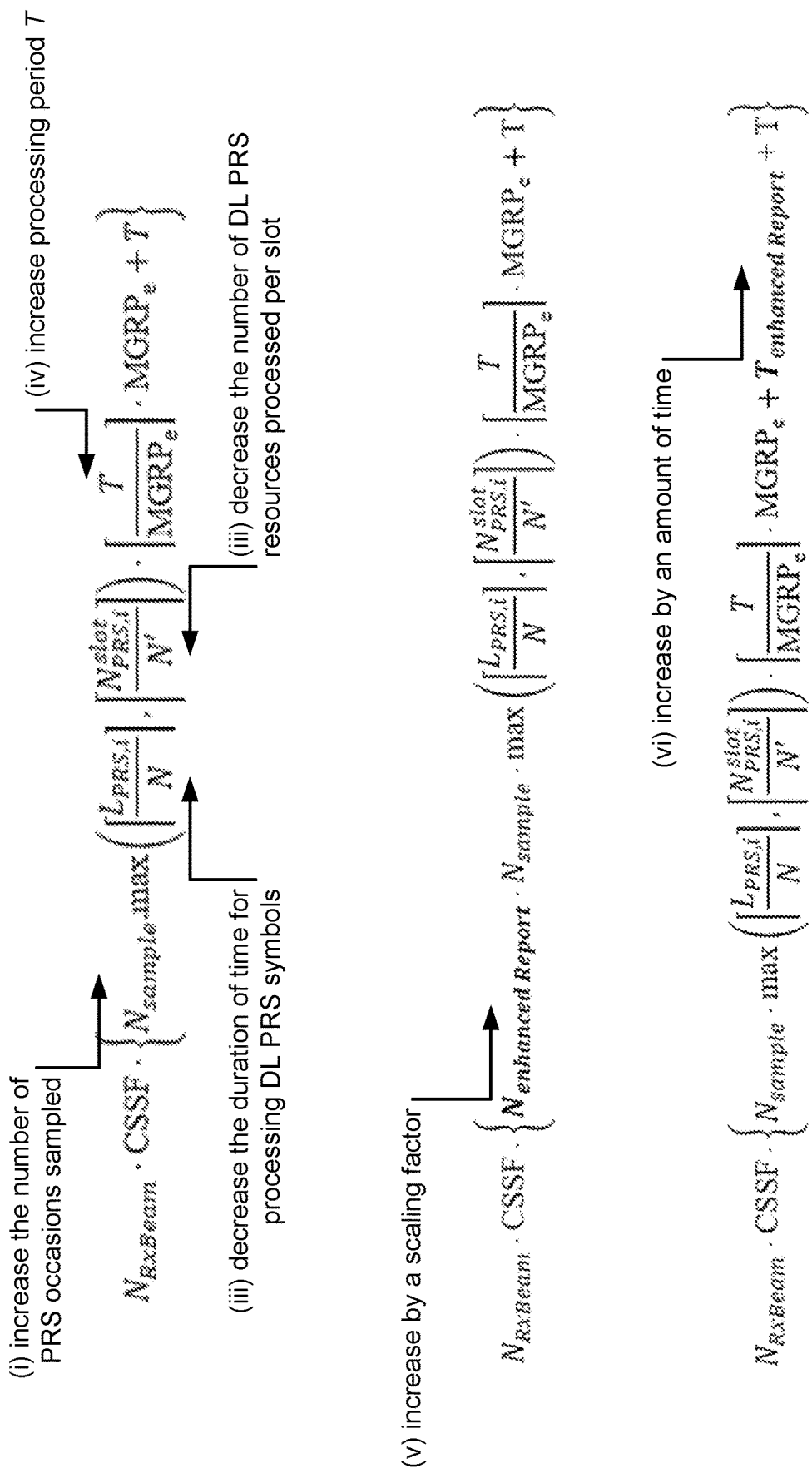
FIG. 14 shows calculation of an enhanced measurement period according to some aspects.

FIG. 14 illustrates some of the ways by which the measurement period may be increased to accommodate providing an enhanced report.

FIG. 14, (i) shows an aspect, in which an increased measurement period may be specified by changing (e.g., increasing) the value of $N_{sample}$ to a different value that may depend on the band, band combination, or FR if the UE is expected to do such an enhanced report. For example, if the legacy has $N_{sample}=4$, then for the enhanced report, the $N_{sample}=8$.

FIG. 14, (ii) shows another aspect, in which an increased measurement period may be specified by changing (e.g., reducing) the number of PRS symbols the UE can process (N) if the UE is expected to do such an enhanced report. For example, a constant factor offset may be assumed (e.g., 0.8).

FIG. 14, (iii) shows another aspect, in which an increased measurement period may be specified by changing (e.g., reducing) the number of PRS resources the UE can process per slot (N') if the UE is expected to do such an enhanced report. For example, a constant factor offset may be assumed (e.g., 0.8).

FIG. 14, (iv) shows another aspect, in which an increased measurement period may be specified by changing (e.g., increasing) the time-domain window (T) during which the UE processes the N PRS symbols if the UE is expected to do such an enhanced report. For example, the adjustment may be with a factor.

FIG. 14, (v) shows another aspect, in which an increased measurement period may be specified using an additional constant factor $N_{enhancedReport}$, that scales the measurement period to account for the increased processing that is required:

$$N_{RxBeam} \cdot CSSF \cdot \left\{ N_{enhanced\ Report} \cdot N_{sample} \cdot \max\left(\left\lceil \frac{L_{PRS,i}}{N} \right\rceil, \left\lceil \frac{N_{PRS,i}^{slot}}{N'} \right\rceil\right) \cdot \left\lceil \frac{T}{MGRP_e} \right\rceil \cdot MGRP_e + T \right\}$$

FIG. 14, (vi) shows another aspect, in which an increased measurement period may be specified by an additional constant factor $T_{enhancedReport}$ that is added as a summation to the measurement period to account for the increased processing that is required if the UE is expected to do such an enhanced report:

$$N_{RxBeam} \cdot CSSF \cdot \left\{ N_{sample} \cdot \max\left(\left\lceil \frac{L_{PRS,i}}{N} \right\rceil, \left\lceil \frac{N_{PRS,i}^{slot}}{N'} \right\rceil\right) \cdot \left\lceil \frac{T}{MGRP_e} \right\rceil \cdot MGRP_e + T_{enhanced\ Report} + T \right\}$$

These adjustments may be made individually or in any combination. If multiple enhanced reporting options are specified, a different measurement period may be specified for different types of reports. Moreover, a different level of increase in the measurement period may be specified depending on the confidence level needed for the probability distribution of the metric.

Figure 15:
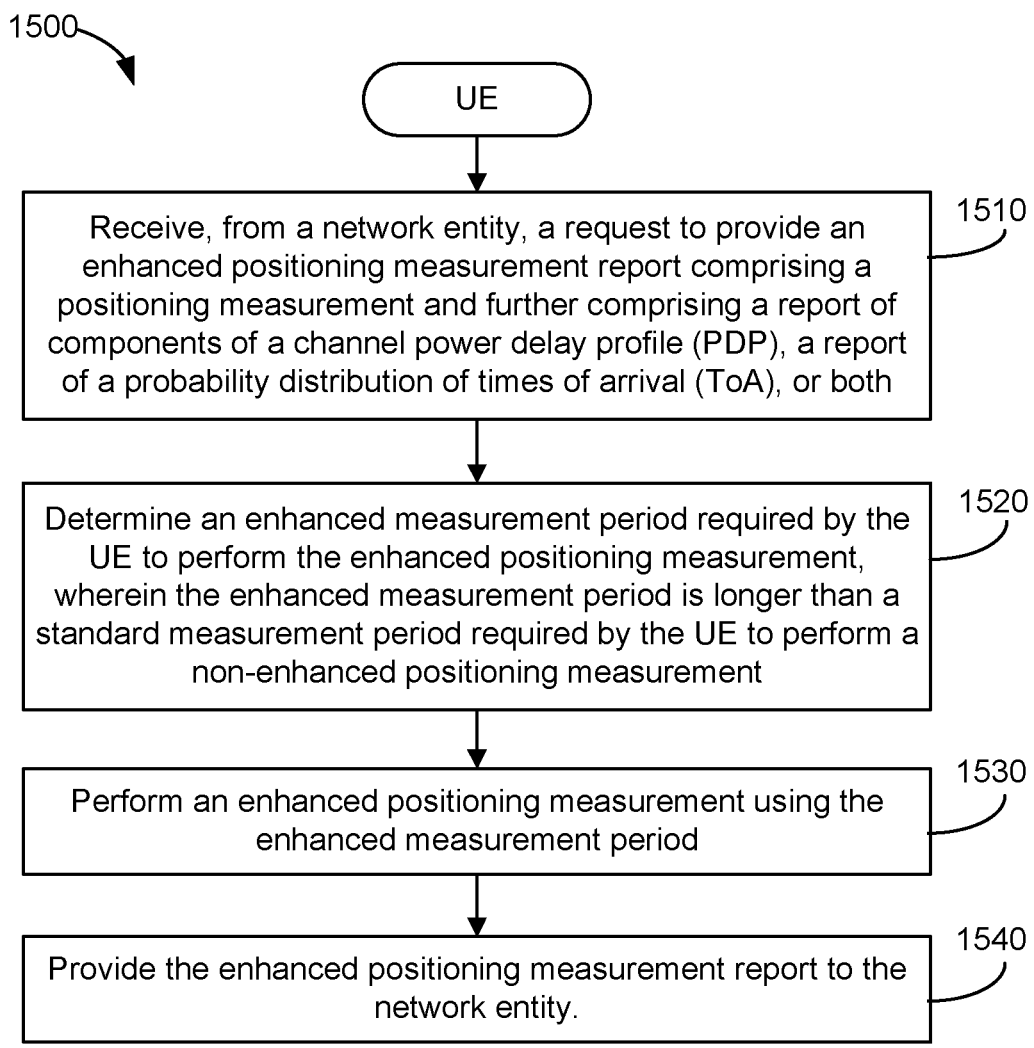
FIG. 15 is a flowchart of an example process associated with dynamic configuration of measurement gaps.

FIG. 15 is a flowchart of an example process 1500 associated with dynamic configuration of measurement gaps. In some implementations, one or more process blocks of FIG. 15 may be performed by a user equipment (UE) (e.g., UE 104). In some implementations, one or more process blocks of FIG. 15 may be performed by another device or a group of devices separate from or including the UE. Additionally, or alternatively, one or more process blocks of FIG. 15 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 1500.

As shown in FIG. 15, process 1500 may include receiving, from a network entity, a request to provide an enhanced positioning measurement report comprising a positioning measurement and further comprising a report of components of a channel power delay profile (PDP), a report of a probability distribution of times of arrival (ToA), or both (block 1510). Means for performing the operation of block 1510 may include the WWAN transceiver(s) 310 of the UE 302. For example, the UE 302 may receive the request to provide an enhanced positioning measurement report using the receiver(s) 312.

As further shown in FIG. 15, process 1500 may include determining an enhanced measurement period required by the UE to perform the enhanced positioning measurement, wherein the enhanced measurement period is longer than a standard measurement period required by the UE to perform a non-enhanced positioning measurement (block 1520). Means for performing the operation of block 1520 may include the processor(s) 332 and the memory 340 of the UE 302. For example, the UE 302 may determine an enhanced measurement period using the processor(s) 332 and memory (340).

In some aspects, determining the enhanced measurement period comprises determining the enhanced measurement period by multiplying the standard measurement period by a constant factor, adding a constant time to the standard measurement period, or a combination thereof.

In some aspects, the standard measurement period is calculated as a function of a number of samples to be measured by the UE and wherein determining the enhanced measurement period comprises increasing the number of samples to be measured by the UE compared to the standard measurement period.

In some aspects, the standard measurement period is calculated as a function of a number of positioning reference signal resources that the UE can process per slot and wherein determining the enhanced measurement period comprises reducing the number of positioning reference signal resources that the UE can process per slot compared to the standard measurement period.

In some aspects, the standard measurement period is calculated as a function of a number of PRS symbols N that the UE can process per unit time T and wherein determining the enhanced measurement period comprises reducing a number of PRS symbols N that the UE can process per unit time T, increasing the value of unit time T required for the UE to process N PRS symbols, or both, compared to the standard measurement period.

As further shown in FIG. 15, process 1500 may include performing an enhanced positioning measurement using the enhanced measurement period (block 1530). Means for performing the operation of block 1530 may include the processor(s) 332, memory 340, or WWAN transceiver(s) 310 of the UE 302. For example, the UE may perform an enhanced positioning measurement using the enhanced measurement period, using the transmitter(s) 314 and receiver(s) 312 to transmit and receive positioning signals and using the processor(s) 332 and memory 340 to calculate values needed for the enhanced positioning measurement report, such as a mean, standard deviation, probability, and/or probability distribution associated with a metric, etc.

In some aspects, process 1500 includes performing an enhanced positioning measurement using the enhanced measurement period further comprises calculating a mean, standard deviation, probability, and/or probability distribution associated with a metric, wherein the metric comprises a ToA, a reference signal time delay (RSTD), or a channel PDP, and providing the enhanced positioning measurement report comprises reporting results of the measurement of the metric and a mean, a standard deviation, a probability, a probability distribution, or a combination thereof, associated with the metric.

In some aspects, performing an enhanced positioning measurement using the enhanced measurement period comprises performing a plurality of measurements of the metric, determining a probability distribution of each of the plurality of measurements, and determining a likelihood of the metric based on a combination of the probability distributions.

As further shown in FIG. 15, process 1500 may include providing the enhanced positioning measurement report to the network entity (block 1540). Means for performing the operation of block 1540 may include the processor(s) 332, memory 340, or WWAN transceiver(s) 310 of the UE 302. For example, the UE may provide the enhanced positioning measurement report to the network entity, using [identify component here].

Process 1500 may include additional implementations, such as any single implementation or any combination of implementations described below and/or in connection with one or more other processes described elsewhere herein. Although FIG. 15 shows example blocks of process 1500, in some implementations, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
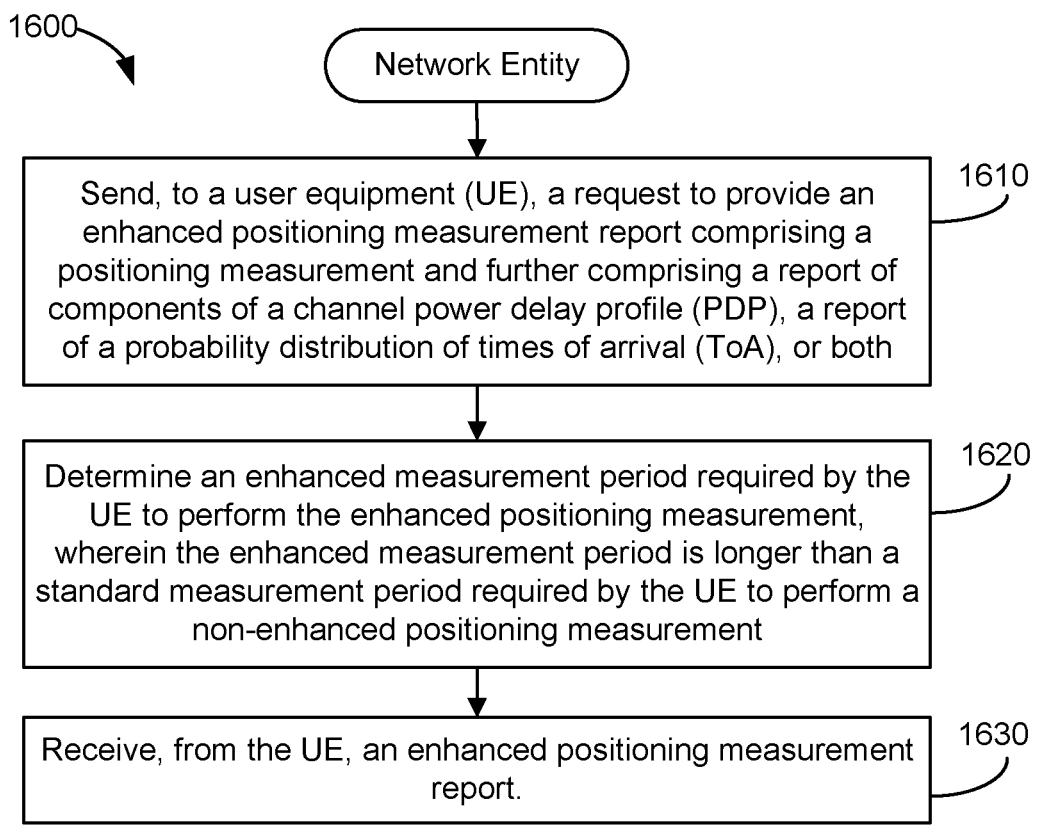
FIG. 16 is a flowchart of an example process associated with dynamic configuration of measurement gaps.

FIG. 16 is a flowchart of an example process 1600 associated with dynamic configuration of measurement gaps. In some implementations, one or more process blocks of FIG. 16 may be performed by a network entity (e.g., network entity REFNUMBER). In some implementations, one or more process blocks of FIG. 16 may be performed by another device or a group of devices separate from or including the network entity. Additionally, or alternatively, one or more process blocks of FIG. 16 may be performed by one or more components of network entity 306, such as processor(s) 394, memory 396, network transceiver(s) 390, and positioning component(s) 398, any or all of which may be means for performing the operations of process 1600.

As shown in FIG. 16, process 1600 may include sending, to a user equipment (UE), a request to provide an enhanced positioning measurement report comprising a positioning measurement and further comprising a report of components of a channel power delay profile (PDP), a report of a probability distribution of times of arrival (ToA), or both (block 1610). Means for performing the operation of block 1610 may include the processor(s) 394, memory 396, or network transceiver(s) 390 of the network entity 306. For example, the network entity 306 may send the request to the UE using the network transceiver(s) 390.

As further shown in FIG. 16, process 1600 may include determining an enhanced measurement period required by the UE to perform the enhanced positioning measurement, wherein the enhanced measurement period is longer than a standard measurement period required by the UE to perform a non-enhanced positioning measurement (block 1620). Means for performing the operation of block 1620 may include the processor(s) 394, memory 396, or network transceiver(s) 390 of the network entity 306. For example, the network entity 306 may determine the enhanced measurement period using the processor(s) 394 and data stored in the memory 396.

In some aspects, determining the enhanced measurement period comprises determining the enhanced measurement period by multiplying the standard measurement period by a constant factor, adding a constant time to the standard measurement period, or a combination thereof.

As further shown in FIG. 16, process 1600 may include receiving, from the UE, an enhanced positioning measurement report (block 1630). Means for performing the operation of block 1630 may include the processor(s) 394, memory 396, or network transceiver(s) 390 of the network entity 306. For example, the network entity may receive the enhanced positioning measurement report from the UE via the network transceiver(s) 390.

In some aspects, receiving the enhanced positioning measurement report comprises receiving results of the measurement of a metric and a mean, standard deviation, probability, and/or probability distribution associated with the metric.

In some aspects, receiving the enhanced positioning measurement report comprises receiving results of the measurement of a metric and a channel PDP associated with the measurement, wherein the metric comprises a ToA, a reference signal time delay (RSTD), or a PDP, and calculating a mean, standard deviation, probability, and/or probability distribution associated with the metric.

In some aspects, process 1600 optionally includes determining a probability distribution of the metric. In some aspects, determining the probability distribution of the metric comprises determining the probability distribution of the metric based on the channel PDP.

Process 1600 may include additional implementations, such as any single implementation or any combination of implementations described below and/or in connection with one or more other processes described elsewhere herein. Although FIG. 16 shows example blocks of process 1600, in some implementations, process 1600 may include additional blocks, fewer blocks, different blocks, or differently arranged blocks than those depicted in FIG. 16. Additionally, or alternatively, two or more of the blocks of process 1600 may be performed in parallel.

As will be appreciated, a technical advantage of the subject matter disclosed herein is that it overcomes the technical problem that the conventional calculation of a measurement period may not provide sufficient time for the UE to perform the enhanced positioning measurements by providing an increased measurement period compared to the measurement period needed to perform standard, non-enhanced positioning measurements.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method, performed by a user equipment (UE), for performing an enhanced positioning measurement, the method comprising: receiving, from a network entity, a request to provide an enhanced positioning measurement report comprising a positioning measurement and further comprising a report of components of a channel power delay profile (PDP), a report of a probability distribution of times of arrival (ToA), or both; determining an enhanced measurement period required by the UE to perform the enhanced positioning measurement, wherein the enhanced measurement period is longer than a standard measurement period required by the UE to perform a non-enhanced positioning measurement; performing the enhanced positioning measurement using the enhanced measurement period; and providing the enhanced positioning measurement report to the network entity.

Clause 2. The method of clause 1, wherein determining the enhanced measurement period comprises determining the enhanced measurement period by multiplying the standard measurement period by a constant factor, adding a constant time to the standard measurement period, or a combination thereof.

Clause 3. The method of any of clauses 1 to 2, wherein the standard measurement period is calculated as a function of a number of samples to be measured by the UE and wherein determining the enhanced measurement period comprises increasing the number of samples to be measured by the UE compared to the standard measurement period.

Clause 4. The method of any of clauses 1 to 3, wherein the standard measurement period is calculated as a function of a number of positioning reference signal resources that the UE can process per slot and wherein determining the enhanced measurement period comprises reducing the number of positioning reference signal resources that the UE can process per slot compared to the standard measurement period.

Clause 5. The method of any of clauses 1 to 4, wherein the standard measurement period is calculated as a function of a number of PRS symbols N that the UE can process per unit time and wherein determining the enhanced measurement period comprises reducing a number of PRS symbols N that the UE can process per unit time, increasing the unit time required for the UE to process N PRS symbols, or both, compared to the standard measurement period.

Clause 6. The method of any of clauses 1 to 5, wherein: performing the enhanced positioning measurement using the enhanced measurement period further comprises calculating a mean, a standard deviation, a probability, a probability distribution, or a combination thereof, associated with a metric, wherein the metric comprises a ToA, a reference signal time delay (RSTD), or a channel PDP; and providing the enhanced positioning measurement report comprises reporting results of the measurement of the metric and the mean, the standard deviation, the probability, the probability distribution, or the combination thereof, associated with the metric.

Clause 7. The method of clause 6, wherein performing the enhanced positioning measurement using the enhanced measurement period comprises: performing a plurality of measurements of the metric; determining the probability distribution of each of the plurality of measurements; and determining a likelihood of the metric based on a combination of the probability distributions.

Clause 8. A method, performed by a network entity, for performing an enhanced positioning measurement, the method comprising: sending, to a user equipment (UE), a request to provide an enhanced positioning measurement report comprising a positioning measurement and further comprising a report of components of a channel power delay profile (PDP), a report of a probability distribution of times of arrival (ToA), or both; determining an enhanced measurement period required by the UE to perform the enhanced positioning measurement, wherein the enhanced measurement period is longer than a standard measurement period required by the UE to perform a non-enhanced positioning measurement; and receiving, from the UE, the enhanced positioning measurement report.

Clause 9. The method of clause 8, wherein determining the enhanced measurement period comprises determining the enhanced measurement period by multiplying the standard measurement period by a constant factor, adding a constant time to the standard measurement period, or a combination thereof.

Clause 10. The method of any of clauses 8 to 9, wherein receiving the enhanced positioning measurement report comprises receiving results of the measurement of a metric and a mean, a standard deviation, a probability, a probability distribution, or a combination thereof, associated with the metric.

Clause 11. The method of any of clauses 8 to 10, wherein receiving the enhanced positioning measurement report comprises receiving results of the measurement of a metric and a channel PDP associated with the measurement, wherein the metric comprises a ToA, a reference signal time delay (RSTD), or a channel PDP, and calculating a mean, a standard deviation, a probability, a probability distribution, or a combination thereof, associated with the metric.

Clause 12. The method of clause 11, comprising determining the probability distribution of the metric.

Clause 13. The method of clause 12, wherein determining the probability distribution of the metric comprises determining the probability distribution of the metric based on the channel PDP.

Clause 14. A user equipment (UE), comprising: a memory; at least one transceiver; and at least one processor communicatively coupled to the memory and the at least one transceiver, the at least one processor configured to: receive, via the at least one transceiver, from a network entity, a request to provide an enhanced positioning measurement report comprising a positioning measurement and further comprising a report of components of a channel power delay profile (PDP), a report of a probability distribution of times of arrival (ToA), or both; determine an enhanced measurement period required by the UE to perform the enhanced positioning measurement, wherein the enhanced measurement period is longer than a standard measurement period required by the UE to perform a non-enhanced positioning measurement; perform the enhanced positioning measurement using the enhanced measurement period; and provide the enhanced positioning measurement report to the network entity.

Clause 15. The UE of clause 14, wherein, to determine the enhanced measurement period, the at least one processor is configured to determine the enhanced measurement period by multiplying the standard measurement period by a constant factor, adding a constant time to the standard measurement period, or a combination thereof.

Clause 16. The UE of any of clauses 14 to 15, wherein the standard measurement period is calculated as a function of a number of samples to be measured by the UE and wherein determining the enhanced measurement period comprises increasing the number of samples to be measured by the UE compared to the standard measurement period.

Clause 17. The UE of any of clauses 14 to 16, wherein the standard measurement period is calculated as a function of a number of positioning reference signal resources that the UE can process per slot and wherein determining the enhanced measurement period comprises reducing the number of positioning reference signal resources that the UE can process per slot compared to the standard measurement period.

Clause 18. The UE of any of clauses 14 to 17, wherein the standard measurement period is calculated as a function of a number of PRS symbols N that the UE can process per unit time and wherein determining the enhanced measurement period comprises reducing a number of PRS symbols N that the UE can process per unit time, increasing the unit time required for the UE to process N PRS symbols, or both, compared to the standard measurement period.

Clause 19. The UE of any of clauses 14 to 18, wherein: perform the enhanced positioning measurement using the enhanced measurement period further comprises calculating a mean, a standard deviation, a probability, a probability distribution, or a combination thereof, associated with a metric, wherein the metric comprises a ToA, a reference signal time delay (RSTD), or a channel PDP; and provide the enhanced positioning measurement report comprises reporting results of the measurement of the metric and the mean, the standard deviation, the probability, the probability distribution, or the combination thereof, associated with the metric.

Clause 20. The UE of clause 19, wherein, to perform the enhanced positioning measurement using the enhanced measurement period, the at least one processor is configured to: perform a plurality of measurements of the metric; determine the probability distribution of each of the plurality of measurements; and determine a likelihood of the metric based on a combination of the probability distributions.

Clause 21. A network entity, comprising: a memory; at least one transceiver; and at least one processor communicatively coupled to the memory and the at least one transceiver, the at least one processor configured to: send, via the at least one transceiver, to a user equipment (UE), a request to provide an enhanced positioning measurement report comprising a positioning measurement and further comprising a report of components of a channel power delay profile (PDP), a report of a probability distribution of times of arrival (ToA), or both; determine an enhanced measurement period required by the UE to perform the enhanced positioning measurement, wherein the enhanced measurement period is longer than a standard measurement period required by the UE to perform a non-enhanced positioning measurement; and receive, via the at least one transceiver, from the UE, the enhanced positioning measurement report.

Clause 22. The network entity of clause 21, wherein, to determine the enhanced measurement period, the at least one processor is configured to determine the enhanced measurement period by multiplying the standard measurement period by a constant factor, adding a constant time to the standard measurement period, or a combination thereof.

Clause 23. The network entity of any of clauses 21 to 22, wherein, to receive the enhanced positioning measurement report, the at least one processor is configured to receive results of the measurement of a metric and a mean, a standard deviation, a probability, a probability distribution, or a combination thereof, associated with the metric.

Clause 24. The network entity of any of clauses 21 to 23, wherein receiving the enhanced positioning measurement report comprises receiving results of the measurement of a metric and a channel PDP associated with the measurement, wherein the metric comprises a ToA, a reference signal time delay (RSTD), or a channel PDP, and calculating a mean, a standard deviation, a probability, a probability distribution, or a combination thereof, associated with the metric.

Clause 25. The network entity of clause 24, comprising determining the probability distribution of the metric.

Clause 26. The network entity of clause 25, wherein, to determine the probability distribution of the metric, the at least one processor is configured to determine the probability distribution of the metric based on the channel PDP.

Clause 27. A user equipment (UE), comprising: means for receiving, from a network entity, a request to provide an enhanced positioning measurement report comprising a positioning measurement and further comprising a report of components of a channel power delay profile (PDP), a report of a probability distribution of times of arrival (ToA), or both; means for determining an enhanced measurement period required by the UE to perform the enhanced positioning measurement, wherein the enhanced measurement period is longer than a standard measurement period required by the UE to perform a non-enhanced positioning measurement; means for performing the enhanced positioning measurement using the enhanced measurement period; and means for providing the enhanced positioning measurement report to the network entity.

Clause 28. The UE of clause 27, wherein the means for determining the enhanced measurement period comprises means for determining the enhanced measurement period by multiplying the standard measurement period by a constant factor, adding a constant time to the standard measurement period, or a combination thereof.

Clause 29. The UE of any of clauses 27 to 28, wherein the standard measurement period is calculated as a function of a number of samples to be measured by the UE and wherein determining the enhanced measurement period comprises increasing the number of samples to be measured by the UE compared to the standard measurement period.

Clause 30. The UE of any of clauses 27 to 29, wherein the standard measurement period is calculated as a function of a number of positioning reference signal resources that the UE can process per slot and wherein determining the enhanced measurement period comprises reducing the number of positioning reference signal resources that the UE can process per slot compared to the standard measurement period.

Clause 31. The UE of any of clauses 27 to 30, wherein the standard measurement period is calculated as a function of a number of PRS symbols N that the UE can process per unit time and wherein determining the enhanced measurement period comprises reducing a number of PRS symbols N that the UE can process per unit time, increasing the unit time required for the UE to process N PRS symbols, or both, compared to the standard measurement period.

Clause 32. The UE of any of clauses 27 to 31, wherein: means for performing the enhanced positioning measurement using the enhanced measurement period further comprises calculating a mean, a standard deviation, a probability, a probability distribution, or a combination thereof, associated with a metric, wherein the metric comprises a ToA, a reference signal time delay (RSTD), or a channel PDP; and means for providing the enhanced positioning measurement report comprises reporting results of the measurement of the metric and the mean, the standard deviation, the probability, the probability distribution, or the combination thereof, associated with the metric.

Clause 33. The UE of clause 32, wherein the means for performing the enhanced positioning measurement using the enhanced measurement period comprises: means for performing a plurality of measurements of the metric; means for determining the probability distribution of each of the plurality of measurements; and means for determining a likelihood of the metric based on a combination of the probability distributions.

Clause 34. A network entity, comprising: means for sending, to a user equipment (UE), a request to provide an enhanced positioning measurement report comprising a positioning measurement and further comprising a report of components of a channel power delay profile (PDP), a report of a probability distribution of times of arrival (ToA), or both; means for determining an enhanced measurement period required by the UE to perform the enhanced positioning measurement, wherein the enhanced measurement period is longer than a standard measurement period required by the UE to perform a non-enhanced positioning measurement; and means for receiving, from the UE, the enhanced positioning measurement report.

Clause 35. The network entity of clause 34, wherein the means for determining the enhanced measurement period comprises means for determining the enhanced measurement period by multiplying the standard measurement period by a constant factor, adding a constant time to the standard measurement period, or a combination thereof.

Clause 36. The network entity of any of clauses 34 to 35, wherein the means for receiving the enhanced positioning measurement report comprises means for receiving results of the measurement of a metric and a mean, a standard deviation, a probability, a probability distribution, or a combination thereof, associated with the metric.

Clause 37. The network entity of any of clauses 34 to 36, wherein receiving the enhanced positioning measurement report comprises receiving results of the measurement of a metric and a channel PDP associated with the measurement, wherein the metric comprises a ToA, a reference signal time delay (RSTD), or a channel PDP, and calculating a mean, a standard deviation, a probability, a probability distribution, or a combination thereof, associated with the metric.

Clause 38. The network entity of clause 37, comprising determining the probability distribution of the metric.

Clause 39. The network entity of clause 38, wherein the means for determining the probability distribution of the metric comprises means for determining the probability distribution of the metric based on the channel PDP.

Clause 40. A non-transitory computer-readable medium storing computer-executable instructions that, when executed by a user equipment (UE), cause the UE to: receive, from a network entity, a request to provide an enhanced positioning measurement report comprising a positioning measurement and further comprising a report of components of a channel power delay profile (PDP), a report of a probability distribution of times of arrival (ToA), or both; determine an enhanced measurement period required by the UE to perform the enhanced positioning measurement, wherein the enhanced measurement period is longer than a standard measurement period required by the UE to perform a non-enhanced positioning measurement; perform the enhanced positioning measurement using the enhanced measurement period; and provide the enhanced positioning measurement report to the network entity.

Clause 41. The non-transitory computer-readable medium of clause 40, wherein the computer-executable instructions that, when executed by the UE, cause the UE to determine the enhanced measurement period comprise computer-executable instructions that, when executed by the UE, cause the UE to determine the enhanced measurement period by multiplying the standard measurement period by a constant factor, adding a constant time to the standard measurement period, or a combination thereof.

Clause 42. The non-transitory computer-readable medium of any of clauses 40 to 41, wherein the standard measurement period is calculated as a function of a number of samples to be measured by the UE and wherein determining the enhanced measurement period comprises increasing the number of samples to be measured by the UE compared to the standard measurement period.

Clause 43. The non-transitory computer-readable medium of any of clauses 40 to 42, wherein the standard measurement period is calculated as a function of a number of positioning reference signal resources that the UE can process per slot and wherein determining the enhanced measurement period comprises reducing the number of positioning reference signal resources that the UE can process per slot compared to the standard measurement period.

Clause 44. The non-transitory computer-readable medium of any of clauses 40 to 43, wherein the standard measurement period is calculated as a function of a number of PRS symbols N that the UE can process per unit time and wherein determining the enhanced measurement period comprises reducing a number of PRS symbols N that the UE can process per unit time, increasing the unit time required for the UE to process N PRS symbols, or both, compared to the standard measurement period.

Clause 45. The non-transitory computer-readable medium of any of clauses 40 to 44, wherein: perform the enhanced positioning measurement using the enhanced measurement period further comprises calculating a mean, a standard deviation, a probability, a probability distribution, or a combination thereof, associated with a metric, wherein the metric comprises a ToA, a reference signal time delay (RSTD), or a channel PDP; and provide the enhanced positioning measurement report comprises reporting results of the measurement of the metric and the mean, the standard deviation, the probability, the probability distribution, or the combination thereof, associated with the metric.

Clause 46. The non-transitory computer-readable medium of clause 45, wherein the computer-executable instructions that, when executed by the UE, cause the UE to perform the enhanced positioning measurement using the enhanced measurement period comprise computer-executable instructions that, when executed by the UE, cause the UE to: perform a plurality of measurements of the metric; determine the probability distribution of each of the plurality of measurements; and determine a likelihood of the metric based on a combination of the probability distributions.

Clause 47. A non-transitory computer-readable medium storing computer-executable instructions that, when executed by a network entity, cause the network entity to: send, to a user equipment (UE), a request to provide an enhanced positioning measurement report comprising a positioning measurement and further comprising a report of components of a channel power delay profile (PDP), a report of a probability distribution of times of arrival (ToA), or both; determine an enhanced measurement period required by the UE to perform the enhanced positioning measurement, wherein the enhanced measurement period is longer than a standard measurement period required by the UE to perform a non-enhanced positioning measurement; and receive, from the UE, the enhanced positioning measurement report.

Clause 48. The non-transitory computer-readable medium of clause 47, wherein the computer-executable instructions that, when executed by the network entity, cause the network entity to determine the enhanced measurement period comprise computer-executable instructions that, when executed by the network entity, cause the network entity to determine the enhanced measurement period by multiplying the standard measurement period by a constant factor, adding a constant time to the standard measurement period, or a combination thereof.

Clause 49. The non-transitory computer-readable medium of any of clauses 47 to 48, wherein the computer-executable instructions that, when executed by the network entity, cause the network entity to receive the enhanced positioning measurement report comprise computer-executable instructions that, when executed by the network entity, cause the network entity to receive results of the measurement of a metric and a mean, a standard deviation, a probability, a probability distribution, or a combination thereof, associated with the metric.

Clause 50. The non-transitory computer-readable medium of any of clauses 47 to 49, wherein receiving the enhanced positioning measurement report comprises receiving results of the measurement of a metric and a channel PDP associated with the measurement, wherein the metric comprises a ToA, a reference signal time delay (RSTD), or a channel PDP, and calculating a mean, a standard deviation, a probability, a probability distribution, or a combination thereof, associated with the metric.

Clause 51. The non-transitory computer-readable medium of clause 50, comprising determining the probability distribution of the metric.

Clause 52. The non-transitory computer-readable medium of clause 51, wherein the computer-executable instructions that, when executed by the network entity, cause the network entity to determine the probability distribution of the metric comprise computer-executable instructions that, when executed by the network entity, cause the network entity to determine the probability distribution of the metric based on the channel PDP.

Clause 53. An apparatus comprising a memory, a transceiver, and a processor communicatively coupled to the memory and the transceiver, the memory, the transceiver, and the processor configured to perform a method according to any of clauses 1 to 13.

Clause 54. An apparatus comprising means for performing a method according to any of clauses 1 to 13.

Clause 55. A non-transitory computer-readable medium storing computer-executable instructions, the computer-executable comprising at least one instruction for causing a computer or processor to perform a method according to any of clauses 1 to 13.

Additional aspects include the following:

In an aspect, a method includes receiving, from a network entity, a request to report an enhanced positioning measurement; determining an enhanced measurement period based on the enhanced positioning measurement; performing an enhanced positioning measurement using the enhanced measurement period; and reporting the enhanced positioning measurement to the network entity according to the determined enhanced measurement period.

In some aspects, determining an enhanced measurement period comprises determining an increased measurement period during which the UE can perform the enhanced positioning measurement compared to a standard measurement period during which the UE can perform a non-enhanced positioning measurement.

In some aspects, determining an increased measurement period comprises modifying a standard measurement period.

In some aspects, modifying a standard measurement period comprises multiplying the standard measurement period by a constant factor, adding a constant time to the standard measurement period, or a combination thereof.

In some aspects, the standard measurement period is calculated as a function of a number of samples to be measured by the UE and modifying the standard measurement period comprises increasing the number of samples to be measured by the UE.

In some aspects, the standard measurement period is calculated as a function of a number of positioning reference signal resources that the UE can process per slot and modifying the standard measurement period comprises reducing the number of positioning reference signal resources that the UE can process per slot.

In some aspects, the standard measurement period is calculated as a function of a number of PRS symbols N that the UE can process per unit time T and modifying the standard measurement period comprises reducing a number of PRS symbols N that the UE can process per unit time T, increasing the value of unit time T required for the UE to process N PRS symbols, or both.

In some aspects, determining an enhanced measurement period comprises determining an enhanced measurement period based at least in part on a confidence level requirement.

In some aspects, performing an enhanced positioning measurement using the enhanced measurement period comprises performing a measurement of a metric.

In some aspects, the metric comprises a time of arrival (TOA), a reference signal time delay (RSTD), or a channel power delay profile (PDP).

In some aspects, reporting the enhanced positioning measurement comprises reporting results of the measurement of the metric and a channel power delay profile associated with the measurement.

In some aspects, performing an enhanced positioning measurement using the enhanced measurement period further comprises calculating a mean, standard deviation, probability, and/or probability distribution associated with the metric, and reporting the enhanced positioning measurement comprises reporting results of the measurement of the metric and the mean, standard deviation, probability, and/or probability distribution associated with the metric.

In some aspects, the mean, standard deviation, probability, and/or probability distribution associated with the metric are reported via an additional path report.

In some aspects, the mean, standard deviation, probability, and/or probability distribution associated with the metric are reported via a new field in the additional path report.

In some aspects, the mean, standard deviation, probability, and/or probability distribution associated with the metric are reported via reuse of an existing field in the additional path report.

In some aspects, reuse of an existing field in the additional path report comprises reuse of a Timing Quality field in the additional path report.

In some aspects, calculating a probability associated with the metric comprises determining a probability distribution of the metric.

In some aspects, determining a probability distribution of the metric comprises determining the probability distribution of the metric based on a channel power delay profile (PDP).

In some aspects, determining the probability distribution of the metric based on a channel power delay profile (PDP) comprises: inputting the channel PDP into a neural network to produce an error distribution; and computing a likelihood of the metric based on the error distribution.

In some aspects, performing an enhanced positioning measurement using the enhanced measurement period further comprises calculating a probability associated with the metric, and reporting the enhanced positioning measurement comprises reporting the probability associated with the metric in the form of a probability mass function over predefined bin ranges, at least one parameter of a Gaussian mixture distribution, a list of percentile values of the metric for pre-defined percentiles, or some combination thereof.

In some aspects, performing an enhanced positioning measurement using the enhanced measurement period comprises: performing a plurality of measurements of a metric; determining a probability distribution of each of the plurality of measurements; and determining a likelihood of the metric based on a combination of the probability distributions.

In an aspect, a method includes sending, to a user equipment (UE), a request for an enhanced positioning measurement; determining an enhanced measurement period based on the enhanced positioning measurement; and receiving, from the UE, an enhanced positioning measurement.

In some aspects, determining the enhanced measurement period comprises determining an increased measurement period during which the UE can perform the enhanced positioning measurement compared to a standard measurement period during which the UE can perform a non-enhanced positioning measurement.

In some aspects, determining the increased measurement period comprises modifying a standard measurement period.

In some aspects, modifying a standard measurement period comprises multiplying the standard measurement period by a constant factor, adding a constant time to the standard measurement period, or a combination thereof.

In some aspects, the standard measurement period is calculated as a function of a number of samples to be measured by the UE and modifying the standard measurement period comprises increasing the number of samples to be measured by the UE.

In some aspects, the standard measurement period is calculated as a function of a number of positioning reference signal resources that the UE can process per slot and modifying the standard measurement period comprises reducing the number of positioning reference signal resources that the UE can process per slot.

In some aspects, the standard measurement period is calculated as a function of a number of PRS symbols N that the UE can process per unit time T and modifying the standard measurement period comprises reducing a number of PRS symbols N that the UE can process per unit time T, increasing the value of unit time T required for the UE to process N PRS symbols, or both.

In some aspects, determining the enhanced measurement period comprises determining an enhanced measurement period based at least in part on a confidence level requirement.

In some aspects, receiving the enhanced positioning measurement comprises receiving results of the measurement of a metric and a channel power delay profile associated with the measurement.

In some aspects, the method includes calculating a mean, standard deviation, probability, and/or probability distribution associated with the metric.

In some aspects, the method further includes determining a probability distribution of the metric.

In some aspects, determining the probability distribution of the metric comprises determining the probability distribution of the metric based on the channel power delay profile (PDP).

In some aspects, determining the probability distribution of the metric based on a channel power delay profile (PDP) comprises: inputting the channel PDP into a neural network to produce an error distribution; and computing a likelihood of the metric based on the error distribution.

In some aspects, receiving the enhanced positioning measurement comprises receiving results of the measurement of a metric and a mean, standard deviation, probability, and/or probability distribution associated with the metric.

In some aspects, the mean, standard deviation, probability, and/or probability distribution associated with the metric are reported via an additional path report.

In some aspects, the mean, standard deviation, probability, and/or probability distribution associated with the metric are reported via a new field in the additional path report.

In some aspects, the mean, standard deviation, probability, and/or probability distribution associated with the metric are reported via reuse of an existing field in the additional path report.

In some aspects, reuse of an existing field in the additional path report comprises reuse of a Timing Quality field in the additional path report.

In some aspects, receiving the enhanced positioning measurement comprises receiving a probability associated with a metric as a probability mass function over predefined bin ranges, at least one parameter of a Gaussian mixture distribution, a list of percentile values of the metric for predefined percentiles, or some combination thereof.

In some aspects, the network entity comprises a base station.

In an aspect, a user equipment (UE) includes a memory; at least one transceiver; and at least one processor communicatively coupled to the memory and the at least one transceiver, the at least one processor configured to: receive, from a network entity, a request to report an enhanced positioning measurement; determine an enhanced measurement period based on the enhanced positioning measurement; perform an enhanced positioning measurement using the enhanced measurement period; and cause the at least one transceiver to send the enhanced positioning measurement to the network entity according to the determined enhanced measurement period.

In some aspects, determining an enhanced measurement period comprises determining an increased measurement period during which the UE can perform the enhanced positioning measurement compared to a standard measurement period during which the UE can perform a non-enhanced positioning measurement.

In some aspects, determining an increased measurement period comprises modifying a standard measurement period.

In some aspects, modifying a standard measurement period comprises multiplying the standard measurement period by a constant factor, adding a constant time to the standard measurement period, or a combination thereof.

In some aspects, the standard measurement period is calculated as a function of a number of samples to be measured by the UE and modifying the standard measurement period comprises increasing the number of samples to be measured by the UE.

In some aspects, the standard measurement period is calculated as a function of a number of positioning reference signal resources that the UE can process per slot and modifying the standard measurement period comprises reducing the number of positioning reference signal resources that the UE can process per slot.

In some aspects, the standard measurement period is calculated as a function of a number of PRS symbols N that the UE can process per unit time T and modifying the standard measurement period comprises reducing a number of PRS symbols N that the UE can process per unit time T, increasing the value of unit time T required for the UE to process N PRS symbols, or both.

In some aspects, determining an enhanced measurement period comprises determining an enhanced measurement period based at least in part on a confidence level requirement.

In some aspects, performing an enhanced positioning measurement using the enhanced measurement period comprises performing a measurement of a metric.

In some aspects, the metric comprises a time of arrival (TOA), a reference signal time delay (RSTD), or a channel power delay profile (PDP).

In some aspects, reporting the enhanced positioning measurement comprises reporting results of the measurement of the metric and a channel power delay profile associated with the measurement.

In some aspects, performing an enhanced positioning measurement using the enhanced measurement period further comprises calculating a mean, standard deviation, probability, and/or probability distribution associated with the metric, and reporting the enhanced positioning measurement comprises reporting results of the measurement of the metric and the mean, standard deviation, probability, and/or probability distribution associated with the metric.

In some aspects, the mean, standard deviation, probability, and/or probability distribution associated with the metric are reported via an additional path report.

In some aspects, the mean, standard deviation, probability, and/or probability distribution associated with the metric are reported via a new field in the additional path report.

In some aspects, the mean, standard deviation, probability, and/or probability distribution associated with the metric are reported via reuse of an existing field in the additional path report.

In some aspects, reuse of an existing field in the additional path report comprises reuse of a Timing Quality field in the additional path report.

In some aspects, calculating a probability associated with the metric comprises determining a probability distribution of the metric.

In some aspects, determining a probability distribution of the metric comprises determining the probability distribution of the metric based on a channel power delay profile (PDP).

In some aspects, determining the probability distribution of the metric based on a channel power delay profile (PDP) comprises: inputting the channel PDP into a neural network to produce an error distribution; and computing a likelihood of the metric based on the error distribution.

In some aspects, performing an enhanced positioning measurement using the enhanced measurement period further comprises calculating a probability associated with the metric, and reporting the enhanced positioning measurement comprises reporting the probability associated with the metric as a probability mass function over predefined bin ranges, at least one parameter of a Gaussian mixture distribution, a list of percentile values of the metric for predefined percentiles, or some combination thereof.

In some aspects, performing an enhanced positioning measurement using the enhanced measurement period comprises: performing a plurality of measurements of a metric; determining a probability distribution of each of the plurality of measurements; and determining a likelihood of the metric based on a combination of the probability distributions.

In an aspect, a network entity includes a memory; at least one transceiver; and at least one processor communicatively coupled to the memory and the at least one transceiver, the at least one processor configured to: cause the at least one transceiver to send, to a user equipment (UE), a request for an enhanced positioning measurement; determine an enhanced measurement period based on the enhanced positioning measurement; and receive, from the UE, an enhanced positioning measurement.

In some aspects, determining the enhanced measurement period comprises determining an increased measurement period during which the UE can perform the enhanced positioning measurement compared to a standard measurement period during which the UE can perform a non-enhanced positioning measurement.

In some aspects, determining the increased measurement period comprises modifying a standard measurement period.

In some aspects, modifying a standard measurement period comprises multiplying the standard measurement period by a constant factor, adding a constant time to the standard measurement period, or a combination thereof.

In some aspects, the standard measurement period is calculated as a function of a number of samples to be measured by the UE and modifying the standard measurement period comprises increasing the number of samples to be measured by the UE.

In some aspects, the standard measurement period is calculated as a function of a number of positioning reference signal resources that the UE can process per slot and modifying the standard measurement period comprises reducing the number of positioning reference signal resources that the UE can process per slot.

In some aspects, the standard measurement period is calculated as a function of a number of PRS symbols N that the UE can process per unit time T and modifying the standard measurement period comprises reducing a number of PRS symbols N that the UE can process per unit time T, increasing the value of unit time T required for the UE to process N PRS symbols, or both.

In some aspects, determining the enhanced measurement period comprises determining an enhanced measurement period based at least in part on a confidence level requirement.

In some aspects, receiving the enhanced positioning measurement comprises receiving results of the measurement of a metric and a channel power delay profile associated with the measurement.

In some aspects, the at least one processor is further configured to calculate a mean, standard deviation, probability, and/or probability distribution associated with the metric.

In some aspects, the at least one processor is further configured to determine a probability distribution of the metric.

In some aspects, determining the probability distribution of the metric comprises determining the probability distribution of the metric based on the channel power delay profile (PDP).

In some aspects, determining the probability distribution of the metric based on a channel power delay profile (PDP) comprises: inputting the channel PDP into a neural network to produce an error distribution; and computing a likelihood of the metric based on the error distribution.

In some aspects, receiving the enhanced positioning measurement comprises receiving results of the measurement of a metric and a mean, standard deviation, probability, and/or probability distribution associated with the metric.

In some aspects, the mean, standard deviation, probability, and/or probability distribution associated with the metric are reported via an additional path report.

In some aspects, the mean, standard deviation, probability, and/or probability distribution associated with the metric are reported via a new field in the additional path report.

In some aspects, the mean, standard deviation, probability, and/or probability distribution associated with the metric are reported via reuse of an existing field in the additional path report.

In some aspects, reuse of an existing field in the additional path report comprises reuse of a Timing Quality field in the additional path report.

In some aspects, receiving the enhanced positioning measurement comprises receiving a probability associated with a metric as a probability mass function over predefined bin ranges, at least one parameter of a Gaussian mixture distribution, a list of percentile values of the metric for predefined percentiles, or some combination thereof.

In some aspects, the network entity comprises a base station.

In an aspect, a user equipment (UE) includes means for receiving, from a network entity, a request to report an enhanced positioning measurement; means for determining an enhanced measurement period based on the enhanced positioning measurement; means for performing an enhanced positioning measurement using the enhanced measurement period; and means for reporting the enhanced positioning measurement to the network entity according to the determined enhanced measurement period.

In an aspect, a base station includes means for sending, to a user equipment (UE), a request for an enhanced positioning measurement; means for determining an enhanced measurement period based on the enhanced positioning measurement; and means for receiving, from the UE, an enhanced positioning measurement.

In an aspect, a non-transitory computer-readable medium storing computer-executable instructions includes at least one instruction instructing a user equipment (UE) to receive, from a network entity, a request to report an enhanced positioning measurement; at least one instruction instructing a user equipment (UE) to determine an enhanced measurement period based on the enhanced positioning measurement; at least one instruction instructing a user equipment (UE) to perform an enhanced positioning measurement using the enhanced measurement period; and at least one instruction instructing a user equipment (UE) to send the enhanced positioning measurement to the network entity according to the determined enhanced measurement period.

In an aspect, a non-transitory computer-readable medium storing computer-executable instructions includes at least one instruction instructing a network entity to send, to a user equipment (UE), a request for an enhanced positioning measurement; at least one instruction instructing a network entity to determine an enhanced measurement period based on the enhanced positioning measurement; and at least one instruction instructing a network entity to receive, from the UE, an enhanced positioning measurement.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, performed by a user equipment (UE), for performing an enhanced positioning measurement, the method comprising:
  receiving, from a network entity, a request to provide an enhanced positioning measurement report comprising a positioning measurement and further comprising a report of components of a channel power delay profile (PDP), a report of a probability distribution of times of arrival (ToA), or both;
  determining an enhanced measurement period required by the UE to perform the enhanced positioning measurement based on number of positioning reference signal (PRS) reference signal time delay (RSTD) samples and number of PRS resources in a slot, wherein the enhanced measurement period is longer than a standard measurement period required by the UE to perform a non-enhanced positioning measurement;
  performing the enhanced positioning measurement within the enhanced measurement period; and
  providing the enhanced positioning measurement report to the network entity.

2. The method of claim 1, wherein determining the enhanced measurement period comprises determining the enhanced measurement period by multiplying the standard measurement period by a constant factor, adding a constant time to the standard measurement period, or a combination thereof.

3. The method of claim 1, wherein the standard measurement period is calculated as a function of a number of samples to be measured by the UE and wherein determining the enhanced measurement period comprises increasing the number of samples to be measured by the UE compared to the standard measurement period.

4. The method of claim 1, wherein the standard measurement period is calculated as a function of a number of positioning reference signal resources that the UE can process per slot and wherein determining the enhanced measurement period comprises reducing the number of positioning reference signal resources that the UE can process per slot compared to the standard measurement period.

5. The method of claim 1, wherein the standard measurement period is calculated as a function of a number of PRS symbols N that the UE can process per unit time and wherein determining the enhanced measurement period comprises reducing a number of PRS symbols N that the UE can process per unit time, increasing the unit time required for the UE to process N PRS symbols, or both, compared to the standard measurement period.

6. The method of claim 1, wherein:
performing the enhanced positioning measurement using the enhanced measurement period further comprises calculating a mean, a standard deviation, a probability, a probability distribution, or a combination thereof, associated with a metric, wherein the metric comprises a ToA, a reference signal time delay (RSTD), or a channel PDP; and
providing the enhanced positioning measurement report comprises reporting results of the measurement of the metric and the mean, the standard deviation, the probability, the probability distribution, or the combination thereof, associated with the metric.

7. The method of claim 6, wherein performing the enhanced positioning measurement using the enhanced measurement period comprises:
performing a plurality of measurements of the metric;
determining the probability distribution of each of the plurality of measurements; and
determining a likelihood of the metric based on a combination of the probability distributions.

8. A method, performed by a network entity, for performing an enhanced positioning measurement, the method comprising:
sending, to a user equipment (UE), a request to provide an enhanced positioning measurement report comprising a positioning measurement and further comprising a report of components of a channel power delay profile (PDP), a report of a probability distribution of times of arrival (ToA), or both;
determining an enhanced measurement period required by the UE to perform the enhanced positioning measurement based on number of positioning reference signal (PRS) reference signal time delay (RSTD) samples and number of PRS resources in a slot, wherein the enhanced measurement period is longer than a standard measurement period required by the UE to perform a non-enhanced positioning measurement; and
receiving, from the UE, the enhanced positioning measurement report.

9. The method of claim 8, wherein determining the enhanced measurement period comprises determining the enhanced measurement period by multiplying the standard measurement period by a constant factor, adding a constant time to the standard measurement period, or a combination thereof.

10. The method of claim 8, wherein receiving the enhanced positioning measurement report comprises receiving results of the measurement of a metric and a mean, a standard deviation, a probability, a probability distribution, or a combination thereof, associated with the metric.

11. The method of claim 8, wherein receiving the enhanced positioning measurement report comprises receiving results of the measurement of a metric and a channel PDP associated with the measurement, wherein the metric comprises a ToA, a reference signal time delay (RSTD), or a channel PDP, and calculating a mean, a standard deviation, a probability, a probability distribution, or a combination thereof, associated with the metric.

12. The method of claim 11, comprising determining the probability distribution of the metric.

13. The method of claim 12, wherein determining the probability distribution of the metric comprises determining the probability distribution of the metric based on the channel PDP.

14. A user equipment (UE), comprising:
a memory;
at least one transceiver; and
at least one processor communicatively coupled to the memory and the at least one transceiver, the at least one processor configured to:
receive, via the at least one transceiver, from a network entity, a request to provide an enhanced positioning measurement report comprising a positioning measurement and further comprising a report of components of a channel power delay profile (PDP), a report of a probability distribution of times of arrival (ToA), or both;
determine an enhanced measurement period required by the UE to perform the enhanced positioning measurement based on number of positioning reference signal (PRS) reference signal time delay (RSTD) samples and number of PRS resources in a slot, wherein the enhanced measurement period is longer than a standard measurement period required by the UE to perform a non-enhanced positioning measurement;
perform the enhanced positioning measurement within the enhanced measurement period; and
provide the enhanced positioning measurement report to the network entity.

15. The UE of claim 14, wherein, to determine the enhanced measurement period, the at least one processor is configured to determine the enhanced measurement period by multiplying the standard measurement period by a constant factor, adding a constant time to the standard measurement period, or a combination thereof.

16. The UE of claim 14, wherein the standard measurement period is calculated as a function of a number of samples to be measured by the UE and wherein determining the enhanced measurement period comprises increasing the number of samples to be measured by the UE compared to the standard measurement period.

17. The UE of claim 14, wherein the standard measurement period is calculated as a function of a number of positioning reference signal resources that the UE can process per slot and wherein determining the enhanced measurement period comprises reducing the number of positioning reference signal resources that the UE can process per slot compared to the standard measurement period.

18. The UE of claim 14, wherein the standard measurement period is calculated as a function of a number of PRS symbols N that the UE can process per unit time and wherein determining the enhanced measurement period comprises reducing a number of PRS symbols N that the UE can process per unit time, increasing the unit time required for the UE to process N PRS symbols, or both, compared to the standard measurement period.

19. The UE of claim 14, wherein:
perform the enhanced positioning measurement using the enhanced measurement period further comprises calculating a mean, a standard deviation, a probability, a probability distribution, or a combination thereof, associated with a metric, wherein the metric comprises a ToA, a reference signal time delay (RSTD), or a channel PDP; and provide the enhanced positioning measurement report comprises reporting results of the measurement of the metric and the mean, the standard deviation, the probability, the probability distribution, or the combination thereof, associated with the metric.

20. The UE of claim 19, wherein, to perform the enhanced positioning measurement using the enhanced measurement period, the at least one processor is configured to:
perform a plurality of measurements of the metric;
determine the probability distribution of each of the plurality of measurements; and
determine a likelihood of the metric based on a combination of the probability distributions.

21. A network entity, comprising:
a memory;
at least one transceiver; and
at least one processor communicatively coupled to the memory and the at least one transceiver, the at least one processor configured to:
send, via the at least one transceiver, to a user equipment (UE), a request to provide an enhanced positioning measurement report comprising a positioning measurement and further comprising a report of components of a channel power delay profile (PDP), a report of a probability distribution of times of arrival (ToA), or both;
determine an enhanced measurement period required by the UE to perform the enhanced positioning measurement based on number of positioning reference signal (PRS) reference signal time delay (RSTD) samples and number of PRS resources in a slot, wherein the enhanced measurement period is longer than a standard measurement period required by the UE to perform a non-enhanced positioning measurement; and
receive, via the at least one transceiver, from the UE, the enhanced positioning measurement report.

22. The network entity of claim 21, wherein, to determine the enhanced measurement period, the at least one processor is configured to determine the enhanced measurement period by multiplying the standard measurement period by a constant factor, adding a constant time to the standard measurement period, or a combination thereof.

23. The network entity of claim 21, wherein, to receive the enhanced positioning measurement report, the at least one processor is configured to receive results of the measurement of a metric and a mean, a standard deviation, a probability, a probability distribution, or a combination thereof, associated with the metric.

24. The network entity of claim 21, wherein receiving the enhanced positioning measurement report comprises receiving results of the measurement of a metric and a channel PDP associated with the measurement, wherein the metric comprises a ToA, a reference signal time delay (RSTD), or a channel PDP, and calculating a mean, a standard deviation, a probability, a probability distribution, or a combination thereof, associated with the metric.

25. The network entity of claim 24, comprising determining the probability distribution of the metric.

26. The network entity of claim 25, wherein, to determine the probability distribution of the metric, the at least one processor is configured to determine the probability distribution of the metric based on the channel PDP.

27. A user equipment (UE), comprising:
means for receiving, from a network entity, a request to provide an enhanced positioning measurement report comprising a positioning measurement and further comprising a report of components of a channel power delay profile (PDP), a report of a probability distribution of times of arrival (ToA), or both;
means for determining an enhanced measurement period required by the UE to perform the enhanced positioning measurement based on number of positioning reference signal (PRS) reference signal time delay (RSTD) samples and number of PRS resources in a slot, wherein the enhanced measurement period is longer than a standard measurement period required by the UE to perform a non-enhanced positioning measurement;
means for performing the enhanced positioning measurement within the enhanced measurement period; and
means for providing the enhanced positioning measurement report to the network entity.

28. A network entity, comprising:
means for sending, to a user equipment (UE), a request to provide an enhanced positioning measurement report comprising a positioning measurement and further comprising a report of components of a channel power delay profile (PDP), a report of a probability distribution of times of arrival (ToA), or both;
means for determining an enhanced measurement period required by the UE to perform the enhanced positioning measurement based on number of positioning reference signal (PRS) reference signal time delay (RSTD) samples and number of PRS resources in a slot, wherein the enhanced measurement period is longer than a standard measurement period required by the UE to perform a non-enhanced positioning measurement; and
means for receiving, from the UE, the enhanced positioning measurement report.

29. A non-transitory computer-readable medium storing computer-executable instructions that, when executed by a user equipment (UE), cause the UE to:
receive, from a network entity, a request to provide an enhanced positioning measurement report comprising a positioning measurement and further comprising a report of components of a channel power delay profile (PDP), a report of a probability distribution of times of arrival (ToA), or both;
determine an enhanced measurement period required by the UE to perform the enhanced positioning measurement based on number of positioning reference signal (PRS) reference signal time delay (RSTD) samples and number of PRS resources in a slot, wherein the enhanced measurement period is longer than a standard measurement period required by the UE to perform a non-enhanced positioning measurement;
perform the enhanced positioning measurement using the enhanced measurement period; and
provide the enhanced positioning measurement report to the network entity.

30. A non-transitory computer-readable medium storing computer-executable instructions that, when executed by a network entity, cause the network entity to:
send, to a user equipment (UE), a request to provide an enhanced positioning measurement report comprising a positioning measurement and further comprising a report of components of a channel power delay profile (PDP), a report of a probability distribution of times of arrival (ToA), or both;

determine an enhanced measurement period required by the UE to perform the enhanced positioning measurement based on number of positioning reference signal (PRS) reference signal time delay (RSTD) samples and number of PRS resources in a slot, wherein the enhanced measurement period is longer than a standard measurement period required by the UE to perform a non-enhanced positioning measurement; and receive, from the UE, the enhanced positioning measurement report.

* * * * *